(12) United States Patent  
Crookes et al.

(10) Patent No.: US 8,483,078 B2
(45) Date of Patent: Jul. 9, 2013

(54) DIGITAL PROGRAM MANAGEMENT

(75) Inventors: Brian Crookes, East York (CA); Karl Stoll, Pickering (CA)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 12/570,830

(22) Filed: Sep. 30, 2009

(65) Prior Publication Data

US 2010/0023963 A1 Jan. 28, 2010

Related U.S. Application Data

(63) Continuation-in-part of application No. 11/127,954, filed on May 12, 2005.

(60) Provisional application No. 61/162,908, filed on Mar. 24, 2009.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |
| H04N 7/00 | (2006.01) |
| H04N 11/00 | (2006.01) |
| H04N 7/173 | (2006.01) |
| H04N 7/08 | (2006.01) |

(52) U.S. Cl.
USPC ........... 370/252; 370/389; 348/465; 725/115; 725/116; 725/132; 725/151

(58) Field of Classification Search
USPC .................. 370/252, 389; 348/465; 725/115, 725/116, 132, 151
See application file for complete search history.

(56) References Cited

U.S. PATENT DOCUMENTS

| | | | |
|---|---|---|---|
| 6,421,359 B1 * | 7/2002 | Bennett et al. | 370/538 |
| 6,463,207 B1 | 10/2002 | Abecassis | |
| 6,505,347 B1 | 1/2003 | Kaneko et al. | |
| 6,611,537 B1 | 8/2003 | Edens et al. | |

(Continued)

FOREIGN PATENT DOCUMENTS

WO    WO 03/090401 A    10/2003

OTHER PUBLICATIONS

Bungum O W: "Transmultiplexing, transcontrol and transcrambling of MPEG-2/DVB signal" Broadcasting Convention, Int'l (Conf. Publ. No. 428) Amsterdam, Neth Sep. 12, 1996 pp. 288-293.

(Continued)

*Primary Examiner* — Alpus H Hsu
*Assistant Examiner* — Yee Lam
(74) *Attorney, Agent, or Firm* — Tarolli, Sundheim, Covell & Tummino LLP

(57) ABSTRACT

An apparatus and methods are disclosed for managing an incoming transport stream. The system can include controls configured for modifying program content as well as for remapping the packet identifiers. These controls thus can be employed for adapting incoming stream information to facilitate the specified actions on the incoming content that is to be managed.

20 Claims, 16 Drawing Sheets

U.S. PATENT DOCUMENTS

| | | | |
|---|---|---|---|
| 6,807,676 B1 | 10/2004 | Robbins et al. | |
| 7,191,461 B1 | 3/2007 | Arsenault et al. | |
| 7,293,066 B1 * | 11/2007 | Day | 709/213 |
| 2005/0289630 A1 * | 12/2005 | Andrews et al. | 725/116 |
| 2007/0172061 A1 * | 7/2007 | Pinder | 380/240 |
| 2008/0162713 A1 * | 7/2008 | Bowra et al. | 709/231 |
| 2008/0313691 A1 * | 12/2008 | Cholas et al. | 725/131 |
| 2008/0320543 A1 * | 12/2008 | Wang et al. | 725/131 |
| 2009/0060044 A1 * | 3/2009 | Suh et al. | 375/240.16 |
| 2009/0086812 A1 * | 4/2009 | Ducharme | 375/240.01 |
| 2009/0138966 A1 * | 5/2009 | Krause et al. | 726/21 |
| 2009/0147840 A1 * | 6/2009 | Sahdra et al. | 375/240.01 |

OTHER PUBLICATIONS

Hall R: "Teating operational digital TV systems" Broadcasting Convention (Publ. 447) Amsterdam, Neth Sep. 12, 1997 p. 514-518.

Ramaswamy A et al: "Design of an efficient DVB/MPEG transport stream remultiplexor" Circuits and Systems, Aug. 11, 2000 Piscataway, NJ pp. 754-757.

Birch C H: "MPEG splicing and bandwidth management" Broadcasting Convention (Publ. 447) Amsterdam Neth Sep. 12, 1997 p. 541-546.

* cited by examiner

DIGITAL PROGRAM MANAGEMENT

CROSS-REFERENCE TO RELATED APPLICATIONS

The present application is a continuation-in-part of U.S. patent application Ser. No. 11/127,954, which was filed on May 12, 2005 and entitled DIGITAL PROGRAM MAPPING, and also claims the benefit of U.S. Provisional Application No. 61/162,908, which was filed on Mar. 24, 2009, and entitled DIGITAL PROGRAM MAPPING WITH CONTENT MODIFICATION. The content of each of the above-referenced applications is incorporated herein by reference.

TECHNICAL FIELD

The present invention relates to streams in a communications system and, more specifically, to management of digital program streams.

BACKGROUND

Mixing services within MPEG/DVB transports streams for distribution within the digital tier can require editing of elementary services and associated tables. Downstream equipment is not always interoperable and may expect a very specific assignment of packet IDs (PIDs) and program numbers further complicating the editing process. Traditional solutions apply point-to-point mapping of PIDs for each installation. The input programs and elementary service PIDs are mapped to output PIDs and programs. Any subsequent change on the input side such as a change in the program or referenced elementary services is not necessarily reflected on the output side. Therefore, PID point-to-point remapping unfortunately inhibits several features dependent on dynamic transport changes such as re-tuning, channel changing, service replacement (S/R), and automatic mapping of elementary services as they are added.

Existing remapping controls provide for only manual mapping modifications in the event of, for example, a channel change, selection of a different transport, or when new services are to be added to a program. Manual updates such as channel changes by installers require some knowledge of the transport change and, therefore, the opportunity for installer error is significant for installation change. This is because PID reassignments are specified on an individual basis and every such change must be entered manually. Therefore, burdensome operator invention is often necessary with manual point-to-point remapping which is undesirable.

As a further example, Service Replacement (S/R) is an independent control mechanism that was developed as a means of temporarily switching baseband content at downlink sites. The channel number change as a result of the S/R is not presented to the end user during the switch to alternate programming. In the case of S/R for which any service interruption carries negative consequences, manual intervention is more than undesirable; it is unacceptable from a service provider's point of view.

DETAILED DESCRIPTION

Figure 1:
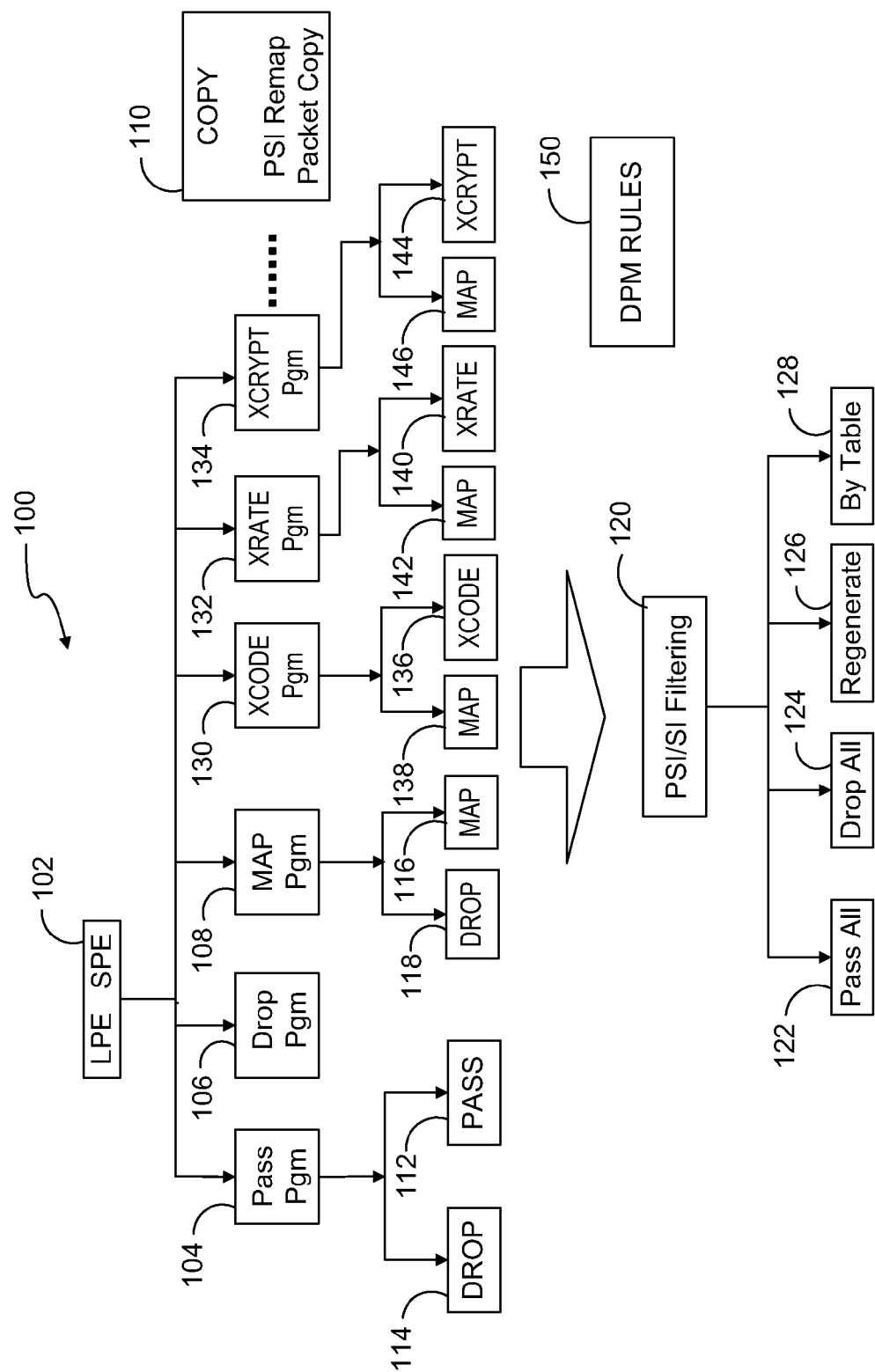
FIG. 1 illustrates a chart of various electronic services of what may happen at the PID level and what may happen to the program specific information (PSI) according to the present invention.

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art.

Embodiments of the present invention can be implemented by one or more multi-decrypt receivers such as a D9828 PowerVu Multi-Decrypt Receiver made by Scientific-Atlanta, Inc. of Lawrenceville, Ga., USA, which emphasizes multiple program control in order to improve automated adjustments based on MPEG program specific information (PSI) tables. Rather than utilizing fixed point-to-point remapping of PIDs, one aspect of the present invention utilizes the type of stream that the PIDs are associated with related program services IDs to specify the associations between input and output programs. This permits mapping at the program level and, therefore, allows dynamic responses to input program changes based upon the program mapping references. Resolving PID mapping based upon programs and the included services allows output PIDs to remain constant service-by-service even as the input programs change. Also, this permits automatic routing of services which may have been added later than installation. Therefore, simplified mapping based upon service type enable PID mapping to be resolved on program changes resulting in simpler program setup for the installer.

Digital program management (DPM) provides a method for grooming services into digital headends by taking advantage of elementary stream and program references to connect input services to specified output mapping and specified content manipulation. This allows indefinite input program changes without further installation requirements to update the output mapping and content modification. DPM can be implemented through the use of program directed controls or primary command modes/selectors may have at least the following command elements: Drop, Pass, Map, Transcode, Transcrypt or Transrate in order to provide grooming functions on a program basis. The Drop, Pass and Map program elements form a category of control for mapping or content references. The Transcode, Transcrypt and Transrate program elements correspond to a control category for modifying actual program content to a different form. Additional command elements may be added. When implemented through a multi-decrypt receiver, another type of receiver or a stream processor, DPM supports remapping of service replacement, channel changes including force tunes and disaster recovery. Additionally or alternatively, DPM can manage content in an output transport stream by performing transrating and transcoding of program elementary streams to the user selected configuration as well as decryption and/or encryption. Such program management functions can apply equally whether a switch to another transport is involved or if the specific change occurs within the presently selected transport.

DPM typically applies to manipulation of service within a single transport stream on a multi-decrypt receiver or a receiver transcoder. However, DPM can also be extended to manipulation of services following a transition to another transport stream on another receiver. Moreover, DPM can be extended to manipulation of selected services on a device multiplexing two or more transport streams on a receiver adapted to receive two or more transport streams and to select programs between the multiple transport stream for decryption, remapping as well as for other modifications to one or more of the transport streams.

In one implementation, by assigning a program a program entry (PE), such program can be selected for DPM processing. The number of available PEs depends on a specific implementation. In some cases, the same program may be assigned to multiple PE's. Also, several different programs may be created from a single input program's content. There are two types of PEs: secure program entries (SPEs) and local program entries (LPEs). SPEs are program entries associated with security elements. Only SPEs support conditional access functions. LPEs are program entries independent of security elements. No conditional access capability is usually associated with an LPE, although by implementing transcrypting controls conditional access can be controlled via DPM.

DPM modes can be associated with PEs. A program is assigned to the PE and the DPM mode remains associated with the program as long as the program occupies the PE. Prior to allocation of any PEs, all programs are considered to be in the unreferenced content of the transport stream. As programs are assigned to PEs for filtering, they are removed from the unreferenced portion of the transport stream. If so enabled, DPM may permit all programs and elementary services within the unreferenced content to appear at the output without further operator intervention.

Unreferenced content is not merely a collection of unwanted PIDs, but can refer to any content that is not explicitly referred to or defined in a table, such as may be defined according to the MPEG DVB or other standard being employed for the transport stream. In one embodiment, the unreferenced content allows two or more multi-decrypt receivers to be concatenated with one another. Decryption may take place in two or more devices while retaining integrity of the processed transport stream. Therefore, the unreferenced content provides the flexibility of not being limited to any particular number of multi-decrypt receivers or other stream processor apparatus.

Additional flexibility exists through unreferenced PIDs since the unreferenced content can exist outside of traditional DPM processing, although still subject to established DPM rules for unreferenced content (e.g., drop, pass, or other specified rules). The processing of such unreferenced content can be similar to the types of processing implemented for referenced content (e.g., PID to PID mapping, content modification or the like). Since the content is unreferenced, however, in order to process such content outside of traditional DPM processing, the uplink and downlink both need to be able to identify the content (e.g., by specifying a PID(s) not identified in any table) and means need to be preprogrammed to control how to process the unreferenced content. The difference is that since content is unreferenced, the DPM rules that have been established for referenced content are not utilized. Instead, the apparatus is programmed to perform a desired function or apply specific rules. It is also possible to modify an unreferenced PID to a referenced PID, such that the previously unreferenced content (now being reference) will be subject to the traditional DPM rules.

As one example, unreferenced content can be utilized as a source of a replacement tables, such as for situations when a given type of output stream might require different set of descriptors from a corresponding input stream. Within DPM, the unreferenced content can be identified (e.g., by PID) and filtered from a transport stream for processing. A user-defined rule can be applied to the unreferenced content in the apparatus to drop and replace a user-specified table associated with the input stream based on the identified unreferenced content. Thus, the system implementing DPM is not rigidly fixed to only the DPM rules. Both table based and explicit PID based rules may be accommodated.

For managing content in transport streams, a DPM mode can be associated with PEs or at smaller units of the streams, such as PIDs. That is, the manipulation of content can be applied to modify program content at the PID level where different PIDs in a given PE are modified differently. For instance, different audio elementary streams in a given PE can be transcoded differently in the output stream for the given PE. Similarly, a given input elementary stream of video can be transcoded to an output video stream according a different type of video encoding. It will be understood that content modification that is implemented via DPM can also involve manipulation of content references and descriptors. The interaction between the various DPM modes can be manually controlled by a user or, alternatively, certain relationships and mapping of content references and descriptors can be automatically implemented based on a defined set of DPM rules. The rules can be fixed or be programmable depending on implementation requirements.

In DPM, the Drop control allows an entire program including all of its elementary streams to be dropped from the transport. Alternatively, less than all of the elementary streams may be dropped. For example, only a single elementary stream may be dropped. Also, if other filtered programs require the dropped material, then only the references may be adjusted rather than completely dropping the elementary streams from the transport stream. DPM supports both explicit and implicit dropping of content. Explicit dropping is one in which the PE is configured with the Drop control is applied to a specific elementary stream within a program. Implicit Drop occurs when a source elementary stream is added to the incoming program and a matching MAP control has not been preconfigured for this elementary stream or content manipulation has not been implemented to modify content of the source stream to a supported output type.

The Pass control passes the program and elementary streams without altering table or PID references unless the installer has applied the Drop control to elementary streams within the program entry. Any elementary stream added by the uplink will typically pass through without modification to the output and the output PSI/service information (SI) references are updated as appropriate to include the new streams. Similarly, changes in the incoming program references and/ or elementary streams assigned to the PE are passed to the output and downstream devices.

The MAP control provides a solution based on PID remap and another in which PSI tables are modified without changing service PIDs. Input PIDs are stamped to installer selected output PIDS. Despite the particular PIDs for the elementary streams set up by the installer, the output mapping is maintained even as the input subsequently changes. Therefore, the MAP control freezes the output PIDs and programs for the benefit of the downstream devices. A variety of controls are provided to enable user initiated synchronization of the input to the output PIDs. Both manual selection of output service PIDs and automated synchronization are possible.

Transcode control is utilized to perform transcoding of one or more input PIDs in which a selected stream type and instance within the group of PIDs in a program has its encoding format changed. An example of this would be to transcode an Audio PID from Dolby AC3 Audio to MPEG Musicam audio. Practical implementations could include decoding the selected PID and re-encoding in a selected format as configured by the user or as implemented receiver. The DPM rules are extended to route the matching stream type and instance in the group of PIDs on the program to the transcoding function. Timing consistency and lipsync are maintained for the program grouping when transcoding is selected. Such synchronization and timing requirements can restrict the operations permitted with the incoming stream such that streams may need to be copied and the transcoded group may be on unique PIDs relative to the remaining incoming stream.

Transrate control is utilized to modify the bitrate of an output stream relative to the corresponding input stream. Transrate control can be considered as a subset of transcode control and, thus, transcoding can involve transrating as an input stream is provided in a different encoding format. As one example, transrating can be implemented to limit the output rate. As another example, transrating can include decoding a selected PID and re-encoding the data at a different bitrate as configured by the user. The DPM rules are extended to route the matching stream type and instance in the group of PIDs on the program to the transrating function. The program grouping (the PIDs associated with a given PE) can be maintained for timing consistency and lipsync. DPM may employs rules that restrict the operations permitted with the incoming stream such that streams may need to be copied and the transrated group may be on unique PIDs relative to the remaining incoming stream.

The transcrypt control provides for control of the outgoing content encryption format. When transcrypting is performed, all the streams within the group of PIDs for given PE will undergo a change in encryption format. As one example, an encrypted input stream can be decrypted by using a Conditional Access Module and DVB BISS (or another form of) encryption can be applied to encrypt the decrypted stream to provide an encrypted output. DPM rules can be applied to route the encrypted PIDs within the PMT program group to the transcrypting function (e.g., hardware and/or software).

In view of the foregoing, the DPM can implement various Management actions on an incoming transport stream that can include remapping the PID, transrating and/or transcoding the format to the user selected configuration as well as transcrypting (encryption removal, retention or modification). These controls follow logic that is programmed to adapt incoming stream information to facilitate the specified actions on the incoming content that is being managed. When DPM controls are utilized to modify content or references to content, the resulting modifications can trigger desired action or events to occur, such as described herein. The desired action or events can include updating (or regenerating) one or more tables or other data structures as well as implementing messaging. The particular actions and events that are triggered can vary according to a set of rules that can be set via appropriate user interface functions according to implementation requirements.

FIG. 1 illustrates one embodiment of the control overview of a DPM system 100 of the present invention, such as can be implemented in transceiver apparatus. In block 102, the LPEs and SPEs are processed at the program level which included programs to implement a plurality of control modes. The control modes can include Pass, Drop and Map as shown in blocks 104, 106, 108, respectively, which relate to controlling references to content. Also, in block 110, all or a portion of an elementary stream may be copied to yield one or more copies of the original stream, or portions thereof, each with a unique PID. The PIDs of the transport stream are filtered by the Pass, Drop or Map controls. Also depicted in FIG. 1 are control modes involving modification of content, which modes can include Xcode, Xrate and Xcrypt controls, indicated respectively at 130, 132, and 134. The PIDs of the transport streams and the associated elementary streams can be modified by the Xcode, Xrate and Xcrypt controls.

From the Drop control 106, one or more of the elementary streams of the transport stream may be dropped, as explained herein. From the Pass control 104, the constituent elementary services may be either passed without modification to the output as shown in block 112 or dropped as shown in block 114. From the Map control 108, the constituent elementary services identified within the input PMT may be either remapped as shown in block 116 and as explained in more detail below or dropped from the output as shown in block 118.

From the Xcode control 130, the constituent elementary streams or selected portions thereof identified (e.g., by PID) may be transcoded to a different encoding format, as shown in block 136. Additionally, when transcoding is implemented, the constituent elementary services in the PMT can be remapped as shown in block 138. Constituent services may alternatively be dropped from the output (not shown for purposes of brevity).

From the Xrate control 132, the bitrate for constituent elementary streams or selected portions thereof identified in the input PMT may be modified to a different bitrate, as shown in block 140. Additionally, when transrating is implemented, the constituent elementary services in the PMT can be remapped as shown in block 142. Constituent services may alternatively be dropped from the output (not shown for purposes of brevity).

From the Xcrypt control 134, the constituent elementary streams or selected portions thereof identified in the input PMT may be transcrypted to a different encrypted or decrypted condition, as shown in block 144. Additionally, when transcrypting is implemented, the constituent elementary services in the PMT can be remapped as shown in block 146. Constituent services may alternatively be dropped from the output (not shown for purposes of brevity).

Associated parameters (or fields) for each control 104, 106, 108, 130, 132, 134 can also be configured as part of implementing any of the respective controls. Related parameters can vary depending on which control(s) is being implemented. Some such parameters for transcoding can include, for example, bitrate, resolution, output aspect ratio, and format to name a few. Similar types of parameters can be configured for the other types of control and may include configuring both input and output settings for the PIDs of each PE. It will be understood that certain parameters can be automatically set to predetermined default parameters, such as through one or templates that can be applied to controls that are being set for a given transport stream.

When any one or more of these controls 104, 106, 108, 130, 132 and/or 134 are applied to an input transport stream, such application can further result in corresponding updates (e.g., descriptors and/or status information in various tables) being automatically implemented. Alternatively, the DPM system 100 can be configured so that one or more of the controls 104, 106, 108, 130, 132, 134 require manual updates to related tables. Rules further can be utilized to selectively control what types of controls can be implemented for a given transport stream.

It will further be understood that the Map, Xcode, Xrate and Xcrypt controls are not mutually exclusive as each such control can be applied selectively in any combination to modify constituent streams on a PID basis as well as other related information.

Additionally or alternatively, when various combinations of these controls are applied, the DPM system 100 can employ DPM rules 150 that apply conflict resolution designed to ensure that the resulting output stream does not violate established priority rules. For instance, the DPM rules 150 can permit the same source elementary stream to be used for multiple DPM transforms and provides for reconciliation of conflicts. Direct collisions arising from multiple references to the same PID for different services may not be mitigated because these are most often a result of direct or indirect user configuration. For example, specifying an audio service and a video service on the output side with the same PID produces an explicit collision that DPM rules will not permit.

However, when input elementary streams are used with multiple different output controls on multiple program entries, the DPM rules can employ conflict resolution hierarchy to determine which control has priority over the others. Resolution of conflicts may involve invalidating a PE's output, invalidating use of one or more single elementary streams within the PE, dropping one or more single ES, dropping a program, selection of a lead PE's output for use by a dependant PE, enforcing DPM conversions on one or more PEs and modifications of content for PIDs. The influence of each option can be evaluated in an order of an established priority until the conflict is resolved; simultaneous evaluation of two or more parameters may be required.

By way of example, the hierarchy of conflict resolution prioritizes in descending order can be as follows: conditional access, mode functions, mapping features and PE order. For instance, the DPM controls may be prioritized in descending order as follows: transcode, transrate, transcrypt, Map, Pass, Drop, and unreferenced content. Other prioritization orders and schemes may be utilized and include fewer or more rules depending on the implementation. The conflict resolution hierarchy in the DPM rules 150 can be implemented to ensure that a stable PE is defined as the filter source for each output program and its constituent elementary streams and, therefore, reduces the likelihood of algorithmic switches from a source PE resulting in output transients that adversely affect downstream equipment.

In the absence of packet copy or PID remapping, the applicable DPM control can be determined for application, and then how PSI regeneration follows the resultant DPM control. Resolution hierarchy depends upon several factors (e.g., DPM control, conditional access status, PE ordering etc.) and allows different rules 150 to apply to the DPM priority control and the ordering of PSI regeneration. For example, packet copy, PID remapping, and PSI remapping represent one hierarchical set at the program level that imposes different limitations on DPM. This is the point of the S/R examples that follow (FIGS. 2-5). In order to determine which elementary services (and PIDs) are used, the source or filtering PE must be first determined. Even something as simple as the dropping of an elementary service requires an evaluation of the rules against all currently assigned programs on the active PEs. For example, an ES may not be dropped if some other program requires it. At most, the ES reference may be removed from the requesting PE's output PMT. This is an example of conflict resolution at the PID level.

Still referring to FIG. 1, once all the PIDs have been dealt with, then the PSI/SI is filtered as shown in block 120. The options available to implement upon the PSI/SI include Pass All, Drop All, Regenerate, and By Table as shown in blocks 122, 124, 126 and 128. In the event of the unreferenced content, the content is not filtered. The unreferenced content is either completely passed or completely dropped. In yet another embodiment, unreferenced content can be subjected to user-defined processing or provide a source of replacement data, such as for tables or a portion thereof.

Figure 2:
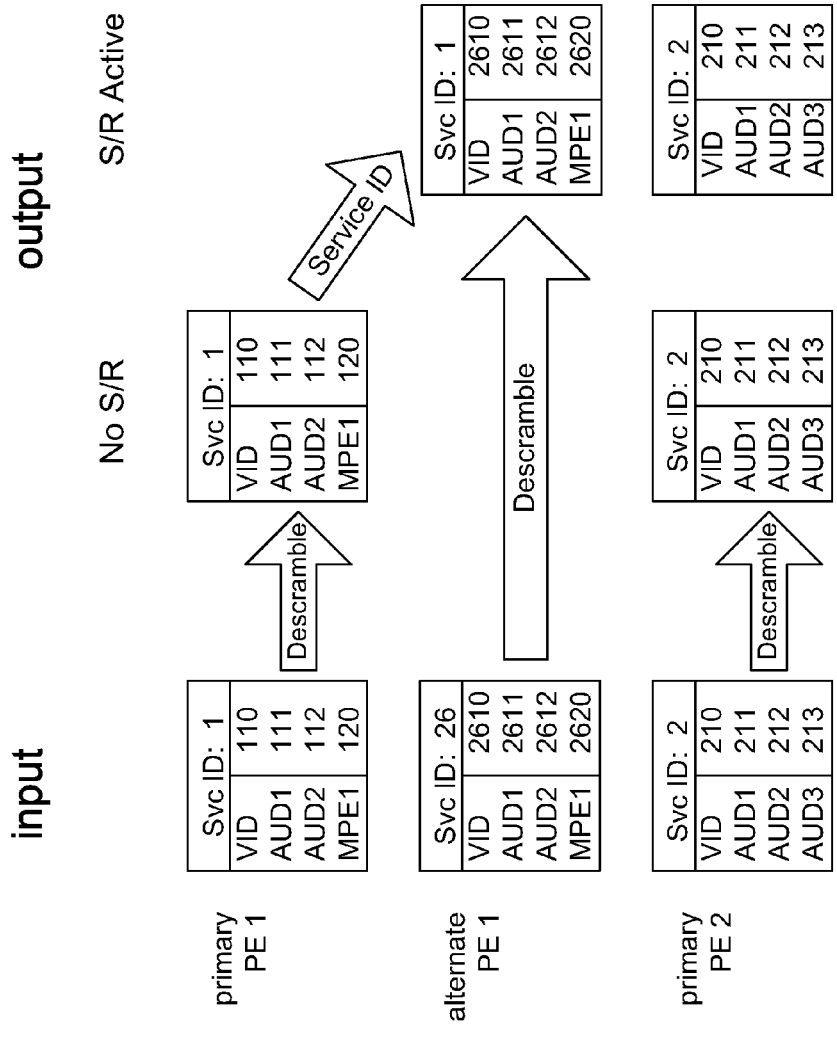
FIG. 2 illustrates PSI remapping during service replacement (S/R).

FIGS. 2-10 illustrate various remapping examples which implement the present invention. FIG. 2 illustrates, in particular, PSI remapping during service replacement. In FIG. 2, at the input there are primary PEs 1 and 2, with an alternate PE 1. Primary PEs 1 and 2 include service IDs 1 and 2, respectively. Alternate PE 1 includes a service ID of 26. The input program map tables (PMTs) of primary PE 1 and alternate PE 1 include one video, two audio, and one Multi Protocol Encapsulation (MPE) elementary streams. Primary PE 2, on the other hand, includes one video and three audio elementary streams.

During the S/R transition from primary (channel 1) to alternate (channel 26) on PE 1, the services of channel 26 replace those of channel 1. Employing PSI remapping, only the primary service ID, 1, is retained and transferred to the PMT of the alternate program on PE 1. No PIDs have been modified. Therefore, the output PMT of service ID 1 now has the PIDs which had corresponded to the PIDs of input PMT alternate PE 1. Thus, program 26 has been remapped as program 1. Other programs on other PEs, such as PE 2 remain unchanged.

Figure 3:
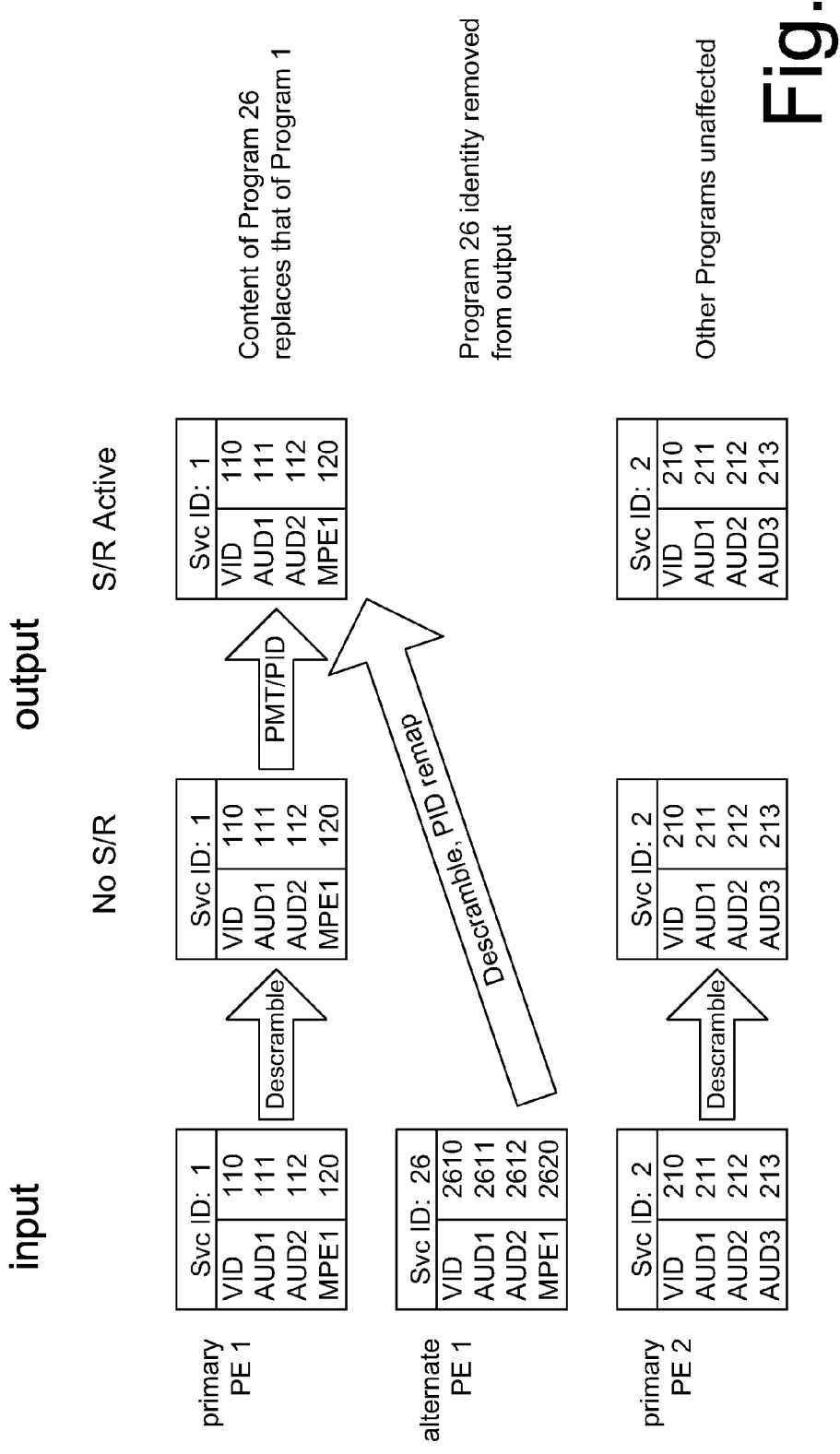
FIG. 3 illustrates PID remapping during S/R.

FIG. 3 illustrates PID remapping during S/R. As in the previous example, at the input there are primary PEs 1 and 2, with an alternate pending on PE 1. Primary PEs 1 and 2 are assigned service IDs 1 and 2, respectively. The alternate program for PE 1 includes a service ID of 26. However, in this example, the content of the alternate, program 26, replaces the content of the primary, program 1 through the PID remapping function. The original PMT of program 1 is retained but the services of program 26 are remapped to retain the PID identities of program 1. The PMT of program 26 is discarded. In other words, the identity of program 26 has been removed from the output. Primary program 2 is again unaffected.

Figure 4:
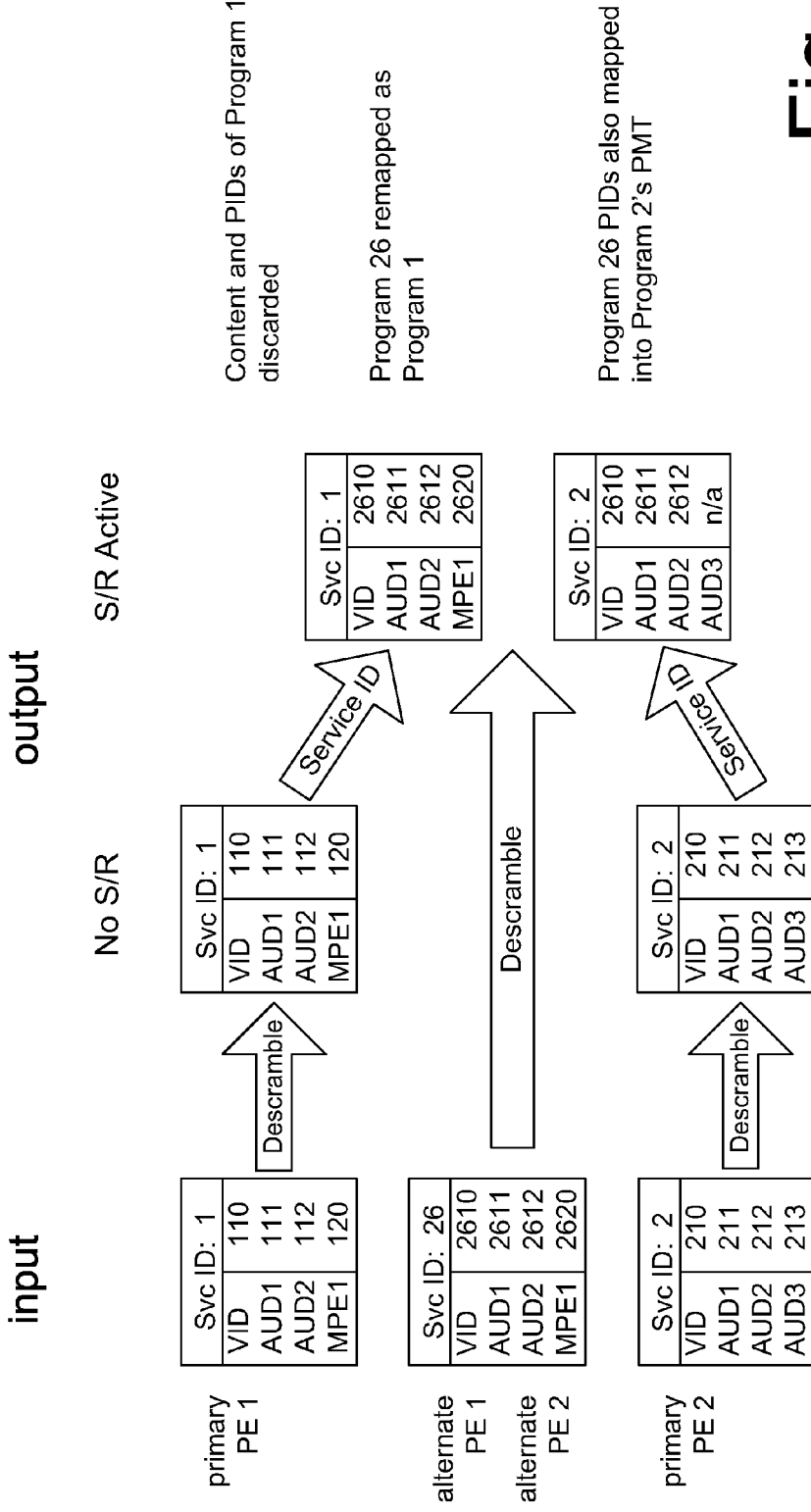
FIG. 4 illustrates PSI remapping and dual S/R.

FIG. 4 illustrates PSI remapping and dual S/R to the same alternate program. At the input there are primary PEs 1 and 2, with the same alternate program pending. PEs 1 and 2 include service IDs 1 and 2, respectively and have a common alternate, service 26. The primary PMT on PE 1 and the alternate PMT include one video, two audio, and one MPE elementary streams. The primary on PE 2, on the other hand, includes one video and three audio elementary streams.

In this example, the content and PIDs of program 1 are discarded in order to filter program 26 in place of program 1. Program 26's PIDs are mapped into program 1's output PMT. The replaced output of program 1 continues to look like program 1 despite having its original content and PIDs discarded. Also, because program 26 is the alternate to primary program 2, Program 26's PIDs are mapped into program 2's output PMT and the replaced output of program 2 continues to look like program 2 despite having its original content and PIDs discarded. However, because program 26 only has two audio elementary streams in the input, the remapped program 2 can only have two audio elementary streams at the output. In this case, the reference to the third audio service is lost because the alternate's PID assignments are retained under PSI remapping. A PID remapping exercise would have permitted the output PMT of remapped program 2 to continue to make reference to the missing elementary stream without discarding it.

Figure 5:
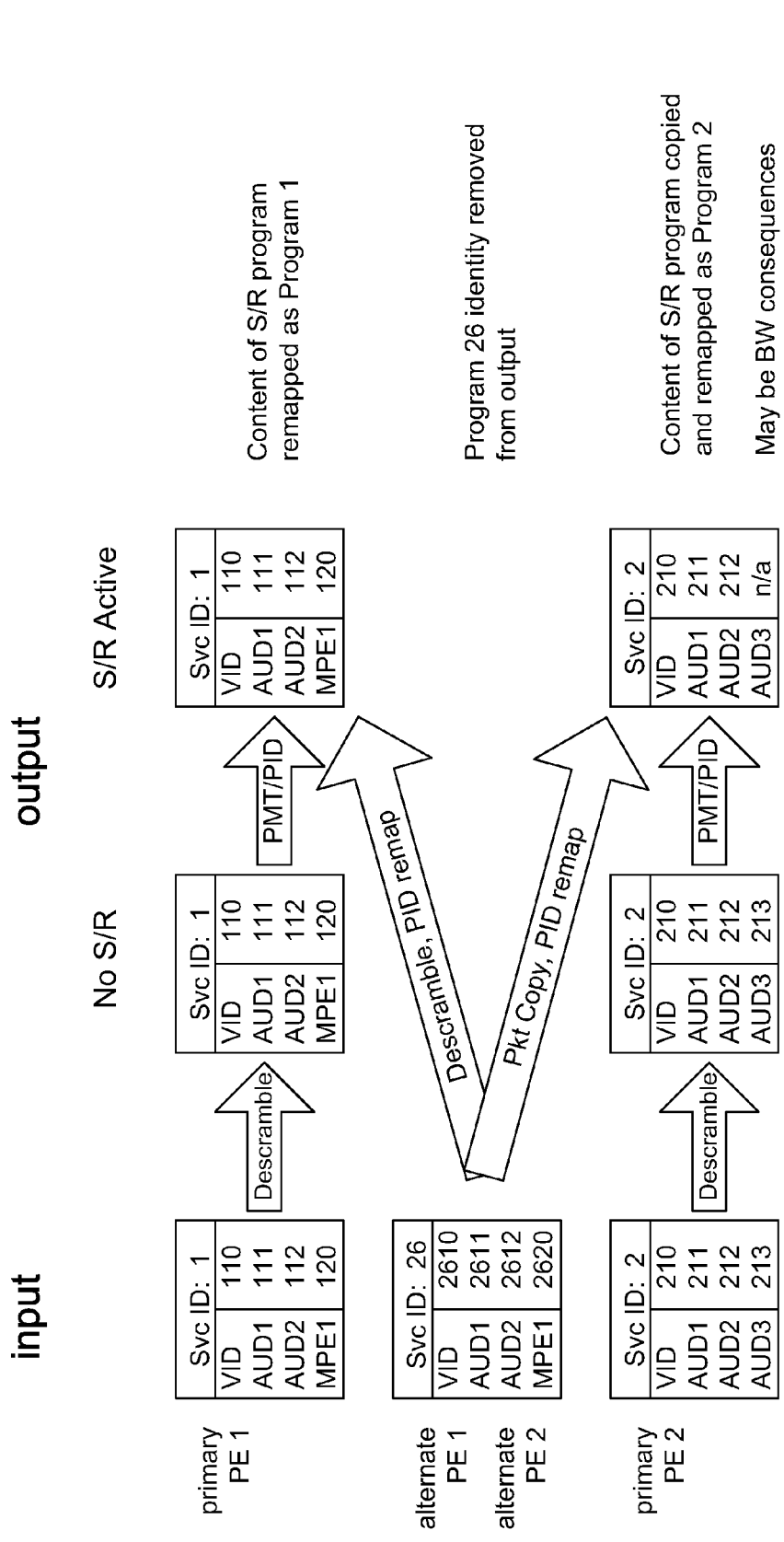
FIG. 5 illustrates PID remapping and dual S/R.

FIG. 5 illustrates in a MAP mode with packet copy an implementation of PID remapping and dual S/R. As in FIG. 4, at the input there are primary PEs 1 and 2, with a common pending alternate program. PEs 1 and 2 include service IDs 1 and 2, respectively and have a common alternate, service 26. The primary PMT on PE 1 and the alternate PMT include one video, two audio, and one MPE elementary streams. The primary on PE 2, on the other hand, includes one video and three audio elementary streams.

The content and PIDs of program 1 are discarded in order to filter program 26 in place of program 1. A PID remap then maps the replaced content of the output PMT of program 1 with the retained the PIDs of the original content of program 1. Also, the input PMT of program 26 is discarded. In other words, the identity of program 26 has been removed from the output of program 1. In this example, which is distinguishable from the example of FIG. 3, Primary program 2 is affected. In FIG. 5, because the program 26 is the alternate to both programs 1 and 2 and it has already been remapped to program 1, the content of program 26 is copied and then remapped as program 2. Note that the PID for audio 3 is retained within the PMT of service ID 2 on PE 2 even though there is no content currently available. There may be bandwidth consequences as a result of the duplication of the content of program 26. Alternatively, as described herein, transcoding and/or other content modification can be employed to generate a third audio elementary stream in an expected encoding format. Thus, by employing content modification controls, content that might otherwise be dropped from a PE during certain types of remapping can be retained in the output PE to mitigate adverse effects.

Figure 6:
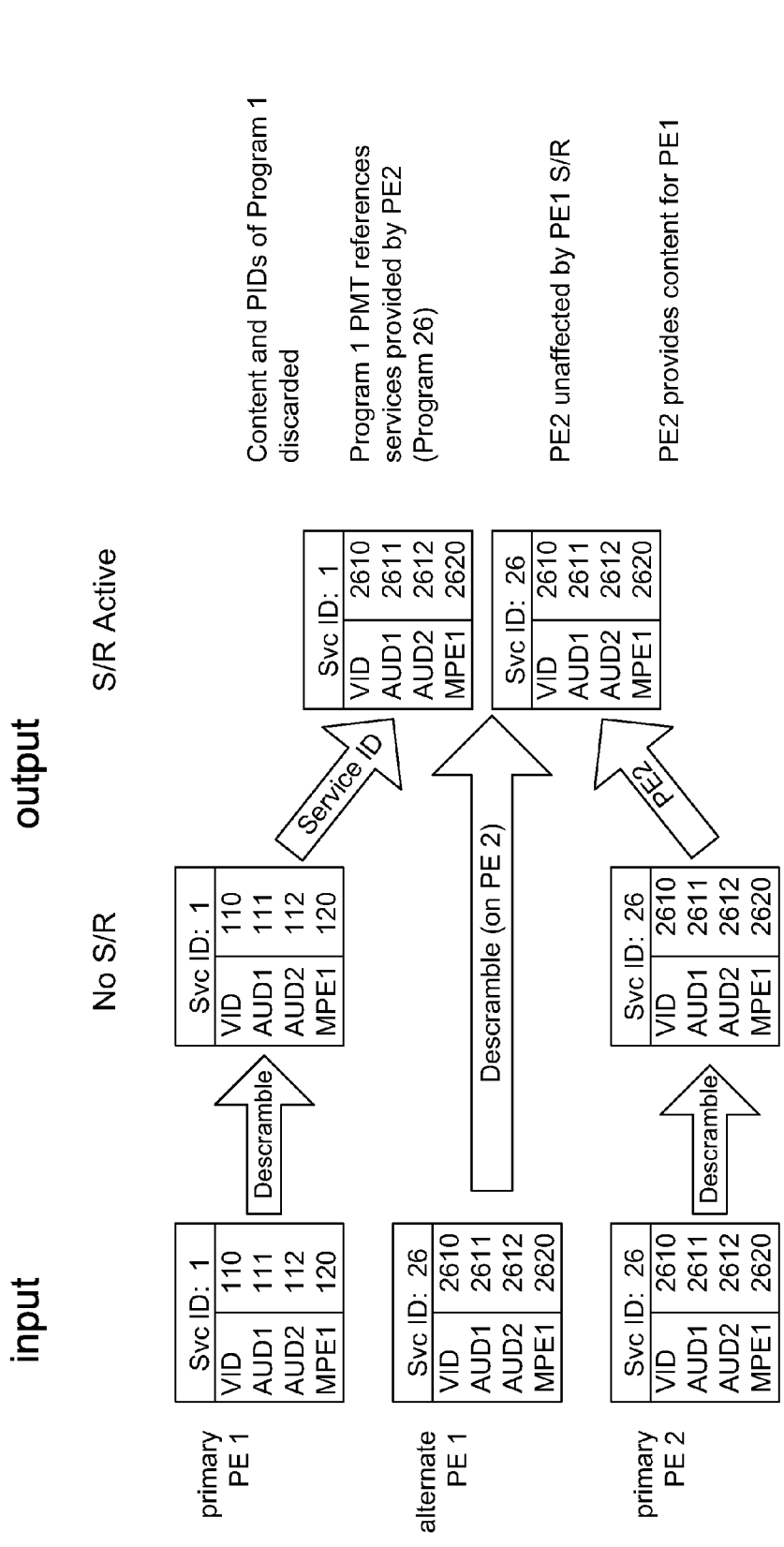
FIG. 6 illustrates PSI remapping and S/R collision.

FIG. 6 illustrates in a MAP mode without packet copy an implementation of PSI remapping and S/R collision. At the input there are primary PEs 1 and 2, with a pending alternate for PE 1. PEs 1 and 2 include service IDs 1 and 26, respectively. The alternate for PE 1 includes a service ID of 26. The primary PMT on PE 1, PE2, and the alternate PMT include one video, two audio, and one MPE elementary streams. However, the alternate program for PE 1 and the primary on PE 2 are the same, resulting in what is commonly referred to as a collision following the S/R.

The content and PIDs of program 1 on PE 1 are discarded in favor of program 26 as provided by PE 2. The regenerated PMT of Program 1 references the services provided by PE 2 having a service ID of 26. PE 2 remains unaffected by the transition. More importantly, downstream devices dependent on service ID 26 perceive no interruption of service.

Figure 7:
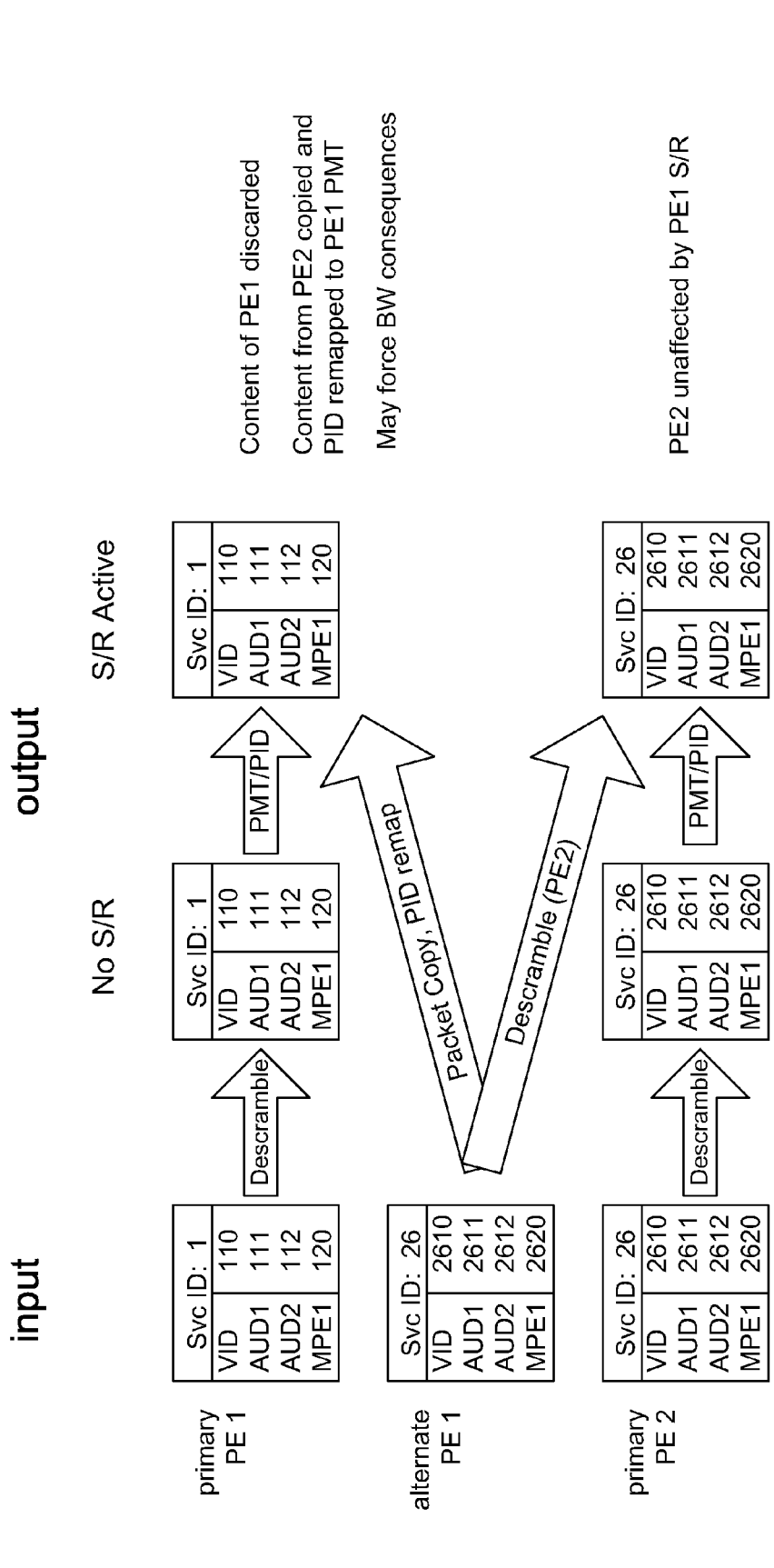
FIG. 7 illustrates PID remapping and S/R collision.

FIG. 7 illustrates in a MAP mode with packet copy an implementation of PID remapping and S/R collision. As in FIG. 6, at the input there are primary PEs 1 and 2, with a pending alternate for PE 1. Primary PEs 1 and 2 include service IDs 1 and 26, respectively. The alternate for PE 1 includes a service ID of 26. The primary PMT on PE 1, PE2, and the alternate PMT include one video, two audio, and one MPE elementary streams. However, there is a collision as a result of the common program shared by the alternate on PE 1 and the primary on PE 2.

In this example, the collision upon S/R can be resolved by copying the elementary stream packets from PE 2 and restamping them with the PIDs referenced in the PMT on PE 1. PE 2 remains unaffected by the service replacement of PE. Again, downstream devices dependent on service ID 26 perceive no interruption of service. However, there may be bandwidth consequences as a result of implementing this example.

Figure 8:
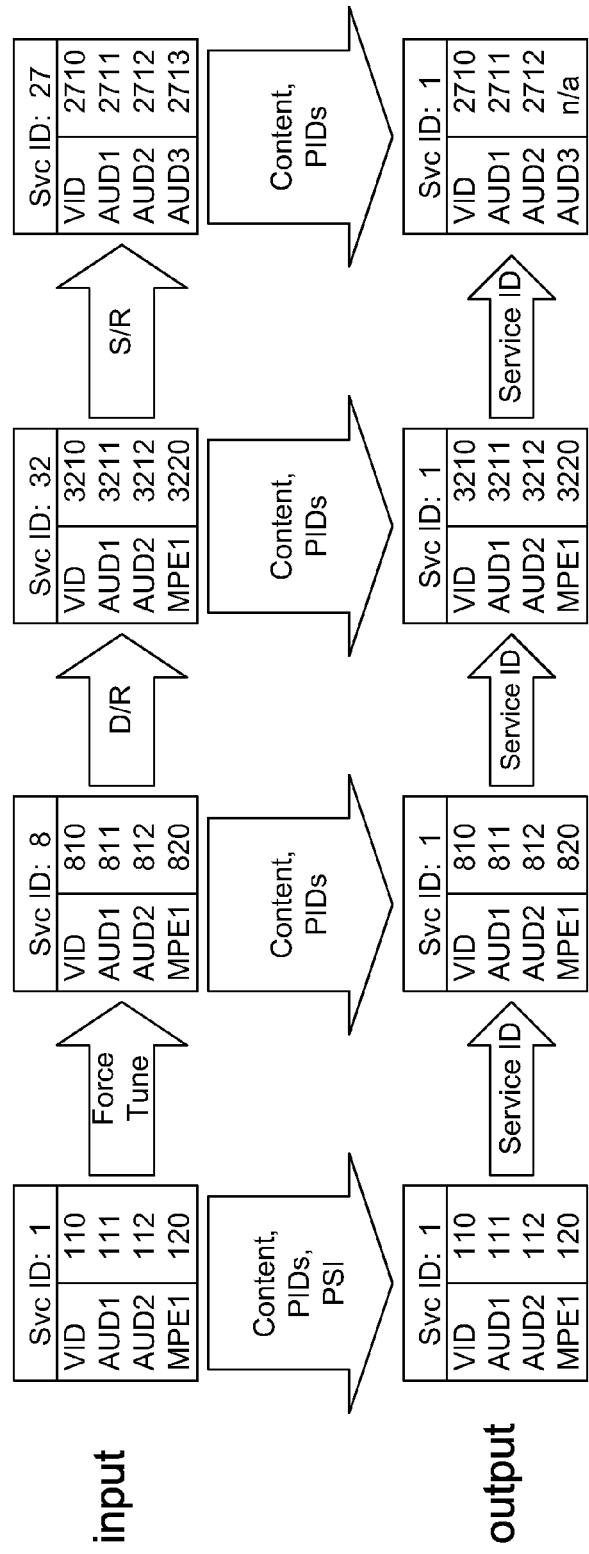
FIG. 8 illustrates PSI remapping transition examples.

FIG. 8 illustrates PSI remapping examples where a PMT, on the input side, having a service ID of 1, is remapped as a result of a force tune, disaster recovery, and a S/R. In each case, the subsequent PMT identifying service ID 1 on the output side along with the filtered PIDs is also depicted. The first output of the PMT with the service ID of 1 is the same without any PSI remapping. However, in the force tune, to the PMT having a service ID of 8 and different PIDs, PSI remapping results in a modified output PMT identifying service ID 1 but retains the content and PIDs of its input PMT.

In the disaster recovery example of PSI remapping, the input PMT identifying service ID 32 results in a modified output PMT again identifying service ID 1 but having the content and PIDs of its input PMT. In the S/R example of PSI remapping, the input PMT identifying service ID 27 results in a modified PMT again identifying service ID 1 but having the content and PIDs of its input PMT. However, in this example of PSI remapping in S/R as depicted in FIG. 8, the output PMT is looking for MPE1 but does not receive it. The PMT identifying service ID 27 has AUD3 shown as being part of the transport stream, but AUD3 will not appear in the output PMT since it was not previously specified when the original output services were selected. Neither will the MPE service appear in the output PMT because an equivalent service is not available on the input PMT. Alternatively, content modification controls can be utilized to retain the audio content (AUD3) in a desired format.

Figure 9:
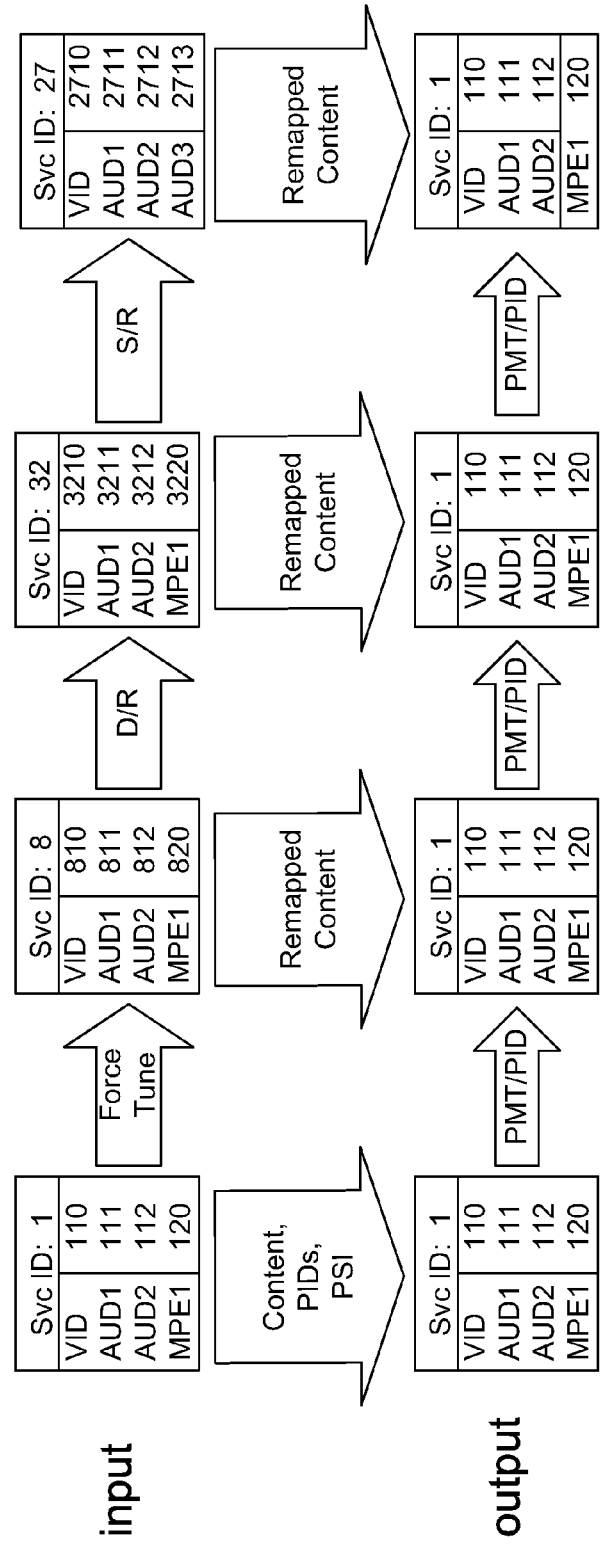
FIG. 9 illustrates PID remapping transition examples.

FIG. 9 illustrates PID remapping examples where the PIDs of a PMT, on the input side, having a service ID of 1, are remapped as a result of a force tune, disaster recovery, and a S/R. In each case, the subsequent PMT identifying service ID 1 remains the same. The first output of the PMT with the service ID of 1 is the same without any PID remapping. However, in the force tune, to the PMT having a service ID of 8 and different PIDs, PID remapping results in a modified output PMT identifying service ID 1 having remapped content. In the disaster recovery and S/R examples, where the input PMT is modified to identify different service IDs and different PIDs, the resulting output PMT includes remapped content and PIDs where the remapped PIDs correspond to the PIDs of the original input PMT. However, in the S/R example of FIG. 9, the input PMT references an elementary stream of AUD3. The resulting output PMT does not reference AUD3 because the original output selection made no such reference. Instead, the output PMT retains the reference to MPE1 without any content being present. Alternatively, content modification controls can be utilized to generate content from one or more other elementary streams to provide the expected content for the referenced MPE1.

Figure 10:
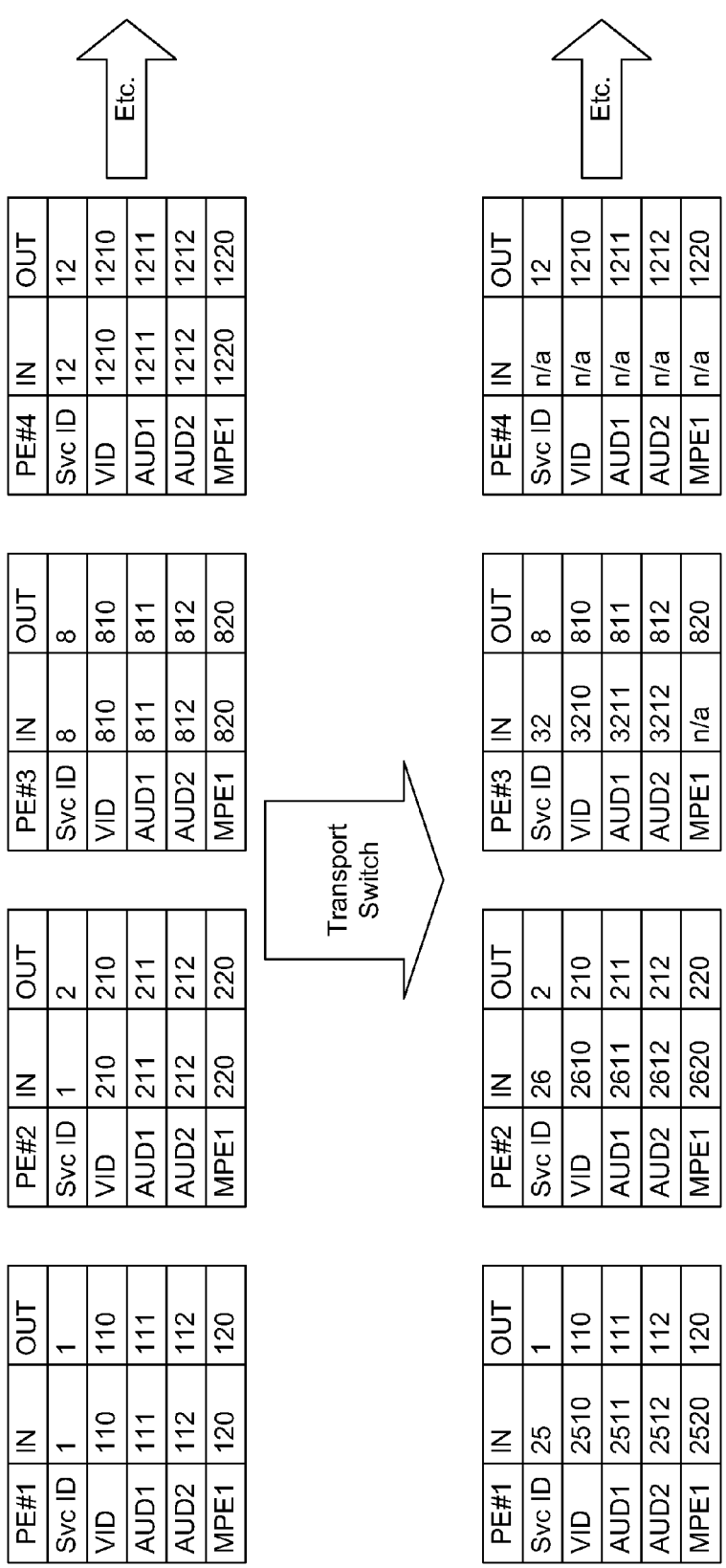
FIG. 10 illustrates disaster recovery and PID remapping.

FIG. 10 illustrates a disaster recovery example where four different PEs are switched to four other PEs. For example, where one satellite fails, a transport stream from an alternate satellite is provided. In each case, the PIDs of the outputs remain the same as the PIDs of their corresponding inputs. In the output PMT of PE 3, reference is made to a MPE stream that is not present. The output PMT of PE 4 is retained even though no replacement source program is provided. A replacement program is one that is substituted in place of another on a PE. In this case, the replacement is provided by the disaster recovery mechanism but could equally be a manual change, a force tune, or a service replacement alternate. Other means of replacement are also possible. The replacement of a program may be initiated at the uplink or through local action.

Figure 11:
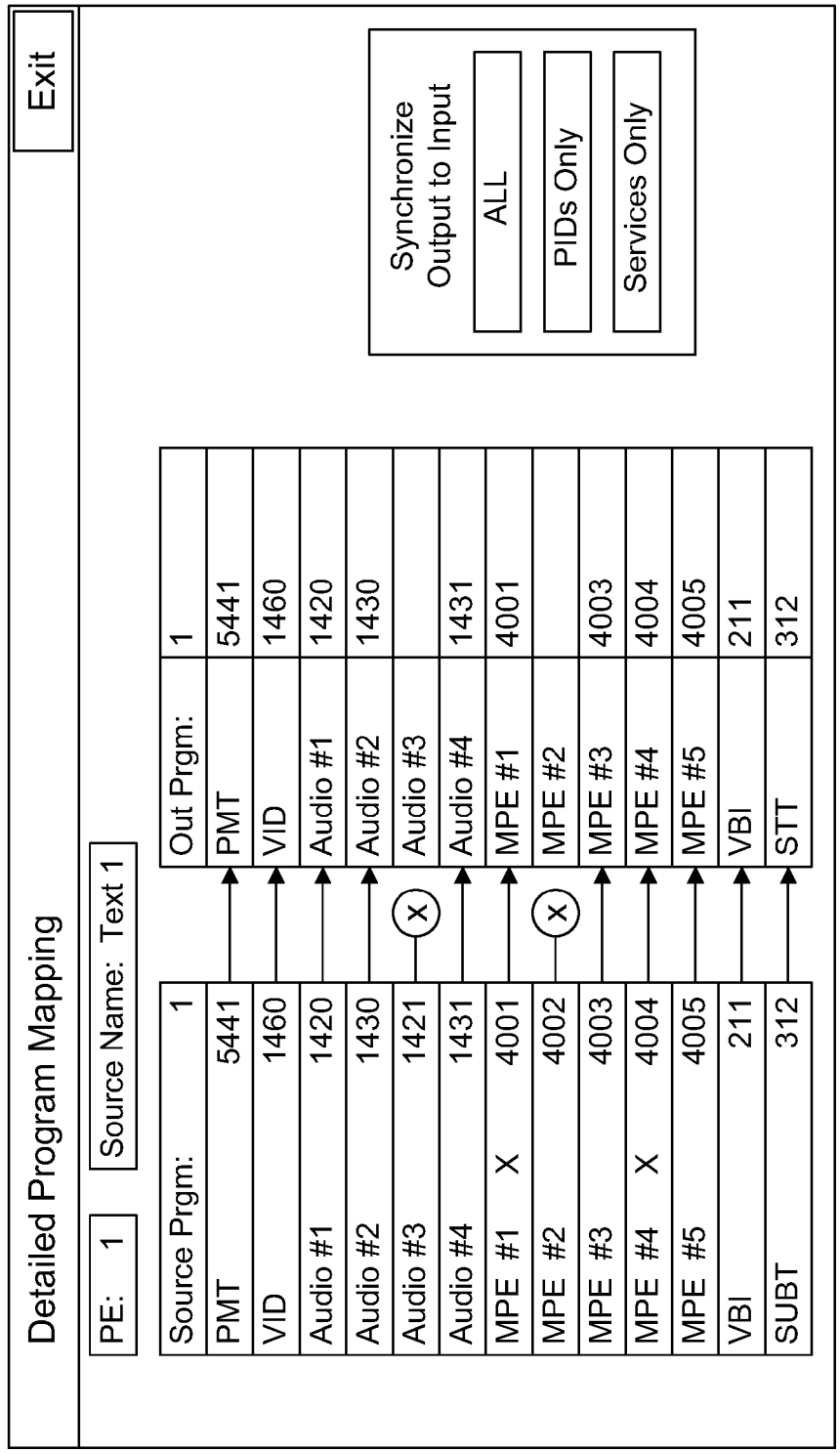
FIG. 11 illustrates a menu for editing program entries.

FIG. 11 depicts a menu of edit program entry details for MAP mode according to one embodiment of the present invention. Each program of the transport stream may be edited is a similar manner. In FIG. 11, PE 1 includes a source program having an input PMT having reference number 5441 and an output program having an output PMT also having reference number 5441. The output program number, output PMT PID, and/or output services may be changed. Each of these may be manually changed or synchronized automatically. Synchronization normalizes the output services and/or their respective PIDs to conditions present on input and/or stored templates. Any remapped PIDs may be depicted in the menu by comparing the PIDs of the input and output of a particular elementary stream. If the PIDs do not match, the PIDs have been remapped and MAP mode guarantees that any output program and service references will be maintained indefinitely regardless of any input change on the same PE.

This detailed program mapping in FIG. 11 depicts audio 3 and MPE 2 dropped from the output as indicted by the circled "X" between the input and output PMTs. These two services would not be restored regardless of any changes on the input side. Only an explicit edit or resynchronization can restore a previously blocked service. Any subsequent change on the input side that adds services such as MPE 6 would not result in those same services appearing on the output side.

Figure 12:
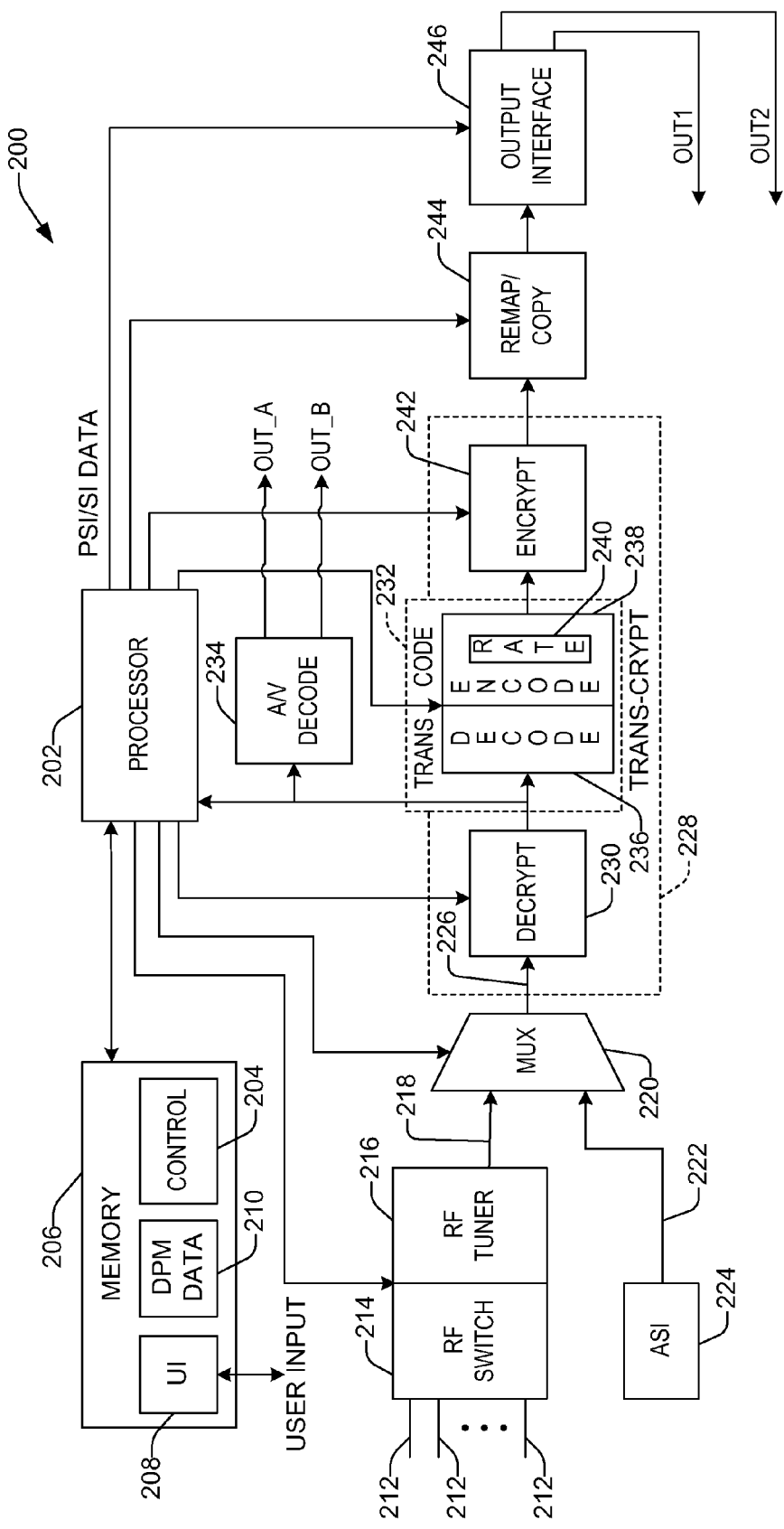
FIG. 12 illustrates an example system for implementing digital program management.

FIG. 12 depicts an example of a transceiver implementing a digital program management (DPM) system 200 that is configured to perform content modification according to an aspect of the invention. The DPM system 200 includes a processor 202 that executes control instructions 204 stored in memory 206 for controlling operation of the system. While the memory 206 is depicted as part of the system 200, such as can be implemented as a transceiver apparatus, various types of memory, including volatile and non-volatile memory can be provided. The memory can be local or remote and may be dedicated to the system 200 or be shared by multiple devices. The memory 206 can also store instructions that provide a user interface 208 that a user can employ to program operating parameters and settings for implementing various aspects of the content modification. The user interface 208 can be provided locally at a housing containing the system for receiving user inputs (e.g., via controls on a front panel display) or it can be remotely provided to a user for receiving user inputs (e.g., via a computer device that is communicatively coupled with the system).

As an example, the user interface 208 can be utilized to program a set of DPM data 210 that is stored in the memory 206. The DPM data 210 can include parameters to control hardware and software that is configured to perform various features relating to the digital program management described herein. For instance, the DPM data 210 can define remapping of PIDs as well as define parameters to control content modification performed by one or more content modifying units implemented in the system 200. In the example of FIG. 12, the content modifying units can perform transcryption, transcoding, and transrating of selected program content based on the control instructions 204 and the DPM data 210 stored in the memory 206.

By of further example, the system 200 includes a plurality of radio frequency (RF) input ports 212 that can be connected to receive corresponding RF input signals from one or more respective signal sources. The sources of the RF input signals at ports 212 can include signals transmitted wirelessly via satellite (e.g., L-band signals from a satellite receiver) or a terrestrial base station or transmitted via one or more physical links, such as fiber and/or electrically conductive lines.

The processor 202 can provide control signals to control an RF switch 214 to selectively provide one (or more) of the RF signals received at the input ports 212 to an RF tuner 216. The selected RF input signal can contain one or more transport stream. The RF tuner 216 can be configured to tune the selected RF input signal at a selected frequency. For example, the processor 202 can be programmed via the user interface 208 to control tuning parameters of the RF tuner 218 to enable tuning of information at a user-defined frequency (or frequencies where multiple tuners are implemented) for providing a digital transport stream at an input 218 of a multiplexer 220.

Another digital input stream can be provided to another input 222 of the multiplexer 220. The stream provided at input 222 can correspond to digital program stream, for example, depicted as being provided via an asynchronous serial interface (ASI) 224. It will be appreciated that other digital stream formats can also be utilized in the system 200 in place of or in addition to the streams at the inputs 218 and 222. The processor 202 (or other controls in the system 200—not shown) provides a selection signal to control the multiplexer 220 to provide a selected input transport stream at an output of the multiplexer, corresponding to either the transport stream at 218 or 222.

The selected transport stream at 226 is provided to a transcript unit 228. The transcrypt unit 228 can be configured to perform transcryption, which can include decryption of the digital stream (or selected portions thereof) from encrypted data to non-encrypted data. Additionally or alternatively, the transcrypt unit 228 can perform encryption of the digital stream (or selected portions thereof) by transforming non-encrypted data to encrypted data. The processor 202 can control encryption parameters, such as keys and other parameters for selectively controlling decryption and encryption of program content in the digital transport stream.

In the example of FIG. 12 the transcrypt unit 228 includes a decrypt block 230 that is configured to decrypt the transport stream provided by the multiplexer at 226 and provide a corresponding decrypted output. The processor 202 provides a decrypt control signal to control the decryption that is being performed by the decrypt block 230. Prior to receiving the content to be decrypted the system 200 can receive via one of its inputs an entitlement management message (EMM) authorizing the system to decrypt program content. The decryption can be performed differently for different parts of the transport stream, which can further be specified in the EMM or by other messaging. For example, a decryption key can be employed to decrypt video packets for one or more programs while the audio may be passed through the decrypt block unmodified. Those skilled in the art will appreciate various decryption hardware and software that can be implemented to decrypt the input stream.

As an example, the decrypt block 230 can be a conditional access module (CAM) or other conditional access hardware and software configured to decrypt content that has been encrypted via a conditional access system, such as a Basic Interoperable Scrambling System (BISS). The type and mode of encryption (e.g., BISS encryption according to Mode 0, 1 or E) can be specified in non-program content data in the transport stream, such as in a conditional access descriptor specified in a program map table (PMT) or other control message stream.

For instance, if the system 200 has been authorized to access program content, the processor 202 can extract conditional access information (e.g., including a conditional access descriptor) from the transport stream and provide corresponding encrypt control information to the decrypt block such that decryption can be applied on selected program content, which can be at the program entry (PE) level or PID level according to the decryption control provided by the processor 202. In the example where the decrypt block 230 is a CAM, the decrypt block can employ an encryption key that can be provided in a smart card or be otherwise programmed in the system 200. Parameters for controlling the decryption can also be stored as part of the DPM data 210 in the memory 206, which can be programmable via the user interface 208.

The decrypt block 230 provides the decrypted transport stream to a transcode unit 232 for subsequent processing. The decrypted stream can also be provided to an A/V decode unit 234 and to the processor 202. The A/V decode unit 234 can decode decrypted audio and video content in the transport stream to provide decoded audio and video at respective outputs OUT_A and OUT_V of the transceiver to provide for playing out of the corresponding audio and/or video.

As mentioned above, the processor 202 can parse the decrypted transport stream and extract selected information carried in the stream (e.g., PSI/SI information) and selectively employ the extracted information to control of the content modifying units and managing other program data, such as remapping of PSI/SI information. In this regard, the processor 202 can provide a transcode control signal to control the transcode unit 232. The processor 202 can execute the control instructions 204 to provide the transcode control signal based on corresponding DPM data, such as can be programmed via the user interface 208.

Based on the transcode control signal, the transcode unit 232 can control whether decoding and/or encoding is performed on content in a given elementary stream as well as the particular methods employed for performing such decoding and encoding of program content. For example, each program entry in the transport stream can include one or more audio, video or a combination of audio and video elementary streams each being encoded according to a specified code. If transcoding is being implemented on a given stream (e.g., via the Xcode control), the output encoding can be different than the input encoding.

The user can employ the user interface 208 to specify the type of decoding (if known) and/or encoding that is to be performed for each elementary stream, such as by specifying encoding methods to be performed on a PID basis. The processor 202, for example, can provide the transcode control depending on the PE and/or PID extracted from the transport stream associated with the program content. The transcode unit 232 thus can decode and re-encode audio and video content in respective elementary streams according to various codecs, such as can be selected via the user interface 208 from a plurality of pre-programmed codecs. The transcode unit 232 can also perform a variety of pre/post filters for denoising, deinterlacing, smoothing, sharpening the program content (e.g., on a PID basis), which functions can also be configured via the user interface 208.

The types of encoding for the input stream and output stream can be different requiring a corresponding transcoding algorithm to convert from the input encoding to a specified output encoding format. Those skilled in the art will understand various known types of hardware and/or software that can be employed to perform selected types of video transcoding from one compression format to another format. Alternatively, the type or format of encoding for the input and output stream may be the same, but associated parameters (e.g., bitrate, resolution, aspect ratio, and the like) can be different. These and other parameter changes can still utilize a transcoding algorithm to modify the parameters, including transrating, even though the encoding format remains unchanged. The following Table I is a non-exhaustive example of possible types of encoding that can be selected (e.g., via the user interface 208) for decoding and encoding input and output video elementary streams. Those skilled in the art will understand and appreciate other video compression techniques and standards (public or proprietary) that can be utilized in the system 200, including those yet to be developed.

TABLE I

Video Compression

Audio Video Standard (AVS)
H.261
H.263
MPEG-4 AVC (or H.264)
CoreAVC
MPEG-1 Video
MPEG-2 Video Similarly to video streams, the types of compression/decompression selected for respective input and output audio stream pairs can be controlled, by implementing corresponding audio transcoding algorithms to convert from an input audio codec to a user-specified output audio codec. The input and output codecs may be the same, but associated parameters (e.g., number of audio channels, bitrate or volume scaling) can be different, which can still utilize a transcoding algorithm or other functions to modify selected parameters, such as to implement transrating. The following TABLE II is an example of some possible types of audio compression/decompression formats that can be utilized for transcoding of input and output audio elementary streams. Those skilled in the art will understand and appreciate other audio compression techniques and standards (public or proprietary) that can be utilized in the system 200, including those yet to be developed.

TABLE II

Audio Compression

MPEG (AC-3),
Dolby Digital
SMPTE 276M
Dolby TrueHD

By way of further example, the transcode unit 232 can include a decode block 236 and an encode block 238. The decode block 236 is configured to decode elementary streams of audio and video content according to any number of one or more codecs. The encoding implemented for audio and program content can be specified by a user via the user interface 208 and stored as part of the DPM data 210 in the memory 206. Alternatively or additionally, certain encoding information can be specified in one or more tables that are transmitted with the PSI/SI information in the transport stream to enable decoding. For instance, the processor 202 can extract encoding information from the decrypted stream and provide control signals to the decode block 236 for decoding respective elementary streams of audio and video content according to the control signals specifying codec(s) for decoding. The decode block 236 can selectively perform the decoding for each elementary stream by the control signal specifying a PID and decoding parameters for program content in each respective elementary stream.

The encode block 238 performs encoding of audio and video content in response to an encode control signals provided by the processor 202. For example, the processor 202 can provide encoding instructions that encode the audio and video content to a format specified according to user-defined encoding parameters that can be stored as the DPM data 210 in the memory 206. The encode block 238 can selectively encode each elementary stream of audio and video content according to the PID and encoding parameters specified in the control signal for each respective elementary stream. The encode block 238 can be implemented as hardware, software or a combination of hardware and software (e.g., an encoding algorithm running in a processor).

The transcode unit 232 can also include a transrate block (RATE) 240 that is configured to modify the bitrate of the transport stream or at least a portion of thereof (e.g., each elementary stream). Additionally, transrating performed by the transrate block 240 can include sample rate conversion, but may use the same sampling rate but higher compression. In the example of FIG. 12, the transrate block 240 is depicted as part of the encode block 238 since the process of transrating can be considered a subset of the transcoding, in which a stream of bits are coded to a different bitrate (e.g., a higher or lower bitrate) without changing the encoding format. Alternatively, it will be understood that processing of the program content for modifying the bitrate can be in hardware and/or software that is separate from the transcode unit 232.

As part of the transcrypt unit 228, the system also includes an encrypt block 242 configured to encrypt program content in the outgoing transport stream. The processor 202 provides an encrypt control signal to the encrypt block 242 such to specify encryption parameters. For example, encryption can be performed on all content in a given program entry including audio and video elementary streams. Alternatively, the DPM data 210 can specify that the encryption is to be performed with respect to video content or audio for the given channel or a program entry on such channel. That is, the encryption can be sufficiently flexible to accommodate various methods of conditional access. Those skilled in the art will understand and appreciate that the encryption can be performed by a processor 202 implementing a given encryption algorithm or by a corresponding conditional access module configured to perform desired encryption based on the encrypt control signal from the processor 202.

By way of example, the encrypt block 242 can selectively encrypt program content based on the encrypt control signal specifying encryption parameters (e.g., an encryption algorithm and encryption key) and a PID or other identifier to specify which program content is to be encrypted. Parameters for controlling the encryption can be stored as part of the DPM data 210 in the memory 206, which can be programmable via the user interface 208. When encryption is performed, the processor 202 can update or generate a conditional access table and other relevant data in the PSI/SI information. For instance, the processor 202 can provide an encryption key as part of a conditional access table or other non-program content to enable decryption of the subsequent downstream transmission. Alternatively, or additionally, the encryption key can be provided to receiving equipment by other means (e.g., programmed via smart cards, downloaded via a communication link and the like).

In addition to performing encryption, outgoing content encryption status can also be updated in the appropriate tables of the PSI/SI information. This can be considered a special case of the transcryption control described above. In this case, instead of changing the encryption type, there is a control as to whether the content is to remain encrypted or be decrypted in the output of the product. For instance, rules can be employed to ensure that PIDs affected by this do not have conflicting directives applied. As one example, a PID referenced by one PMT program and set to be decrypted cannot be output on the same PID by a different PMT program and left encrypted. This provides for control at the PMT program level, while also enforcing DPM rules at the stream and instance PID level.

The encrypt block 242 provides an encrypted, partially encrypted or unencrypted output content stream to a remap/copy block 244. The remap/copy block 244 is operative to remap and/or copy program content (e.g., elementary streams) based on control information from the processor 202, such as shown and described herein (see, e.g., FIGS. 1-11). The resulting output stream is provided to an output interface 246 that is configured to provide one or more output stream, indicated OUT1 and OUT2, although any number of one or more output stream can be provided. Each output stream OUT1 and OUT2 can be provided according to a known protocol. As one example, the outputs can include an MPEG over Internet Protocol (MPEGoIP) stream and an ASI stream, which can be communicated as OUT1 and OUT2 via corresponding output ports. Those skilled in the art will appreciate that the outputs from the output interface 246 are not limited to these examples, and that other types of output protocols can be utilized according to application requirements.

In view of the structural and functional features described above, certain functional features will be better appreciated with reference to FIGS. 13-16. FIGS. 13-16 are being provided by way of context to demonstrate examples that can be implemented to provide for modification of program content via user interfaces and related control functions. It is to be understood and appreciated that these examples are by way of example only and should not be construed as limiting of features that can be implemented in the system. For additional context associated with the features shown and described with respect to FIGS. 13-16, reference can be made to the system 200 of FIG. 12.

Figure 13:
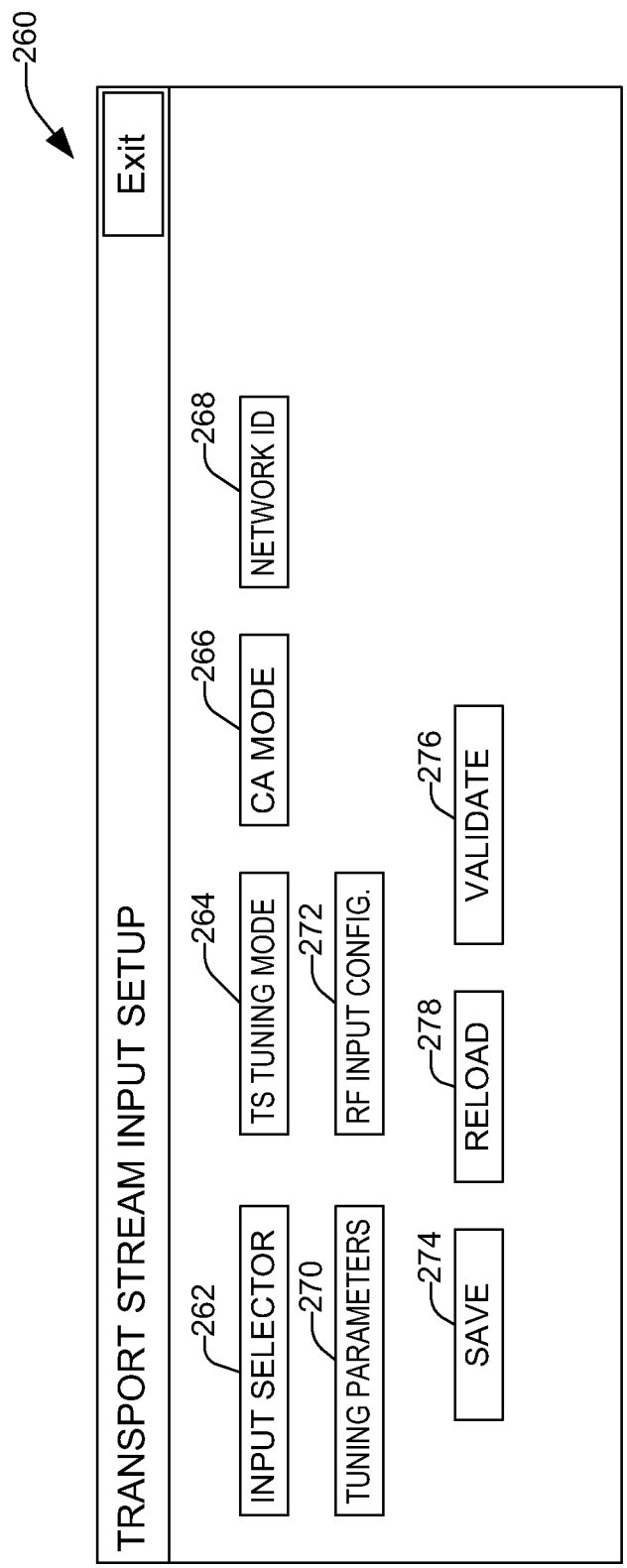
FIG. 13 illustrates an example of a user interface for set up of an input transport stream.

FIG. 13 depicts an example of part of a user interface 260 for transfer stream input set-up. Input settings can be entered manually via an input device, such as at remote computer or an input terminal of a transceiver apparatus implementing the DPM system. Alternatively or additionally, default settings can also be stored in memory for some or all of the settings. The user interface 260 includes an input selector element 262 that is configured to select one of a plurality of input ports that are to be utilized for providing and receiving a corresponding input stream. A transport stream tuning mode user interface element 264 can be selected for defining the tuning mode, such as can be automatic, basic, fixed PID, or a custom user-defined mode.

The user interface 260 also includes a conditional access (CA) mode user interface element 266 that can be utilized to specify via a CA mode. The CA mode can select from one of a plurality of predefined conditional access modes, which can vary according to the platform in which the user interface 260 is implemented. Also as part of configuring the input stream, a network ID user interface element 268 can be selected for entering a network ID associated with the source of the transport stream that is to be received via the selected input in the system. Various other tuning parameters can also be configured via the tuning parameters user interface element 270. Examples of user-programmable tuning parameters can include: downlink operating frequency for tuning the received signal; symbol rate; modulation type; forward error correction inner code rate; input signal spectrum inversion rate for tracking and selecting inverted and non-inverted signals; a roll-off factor for the incoming signal; local oscillator frequencies for each of the inputs; cross-over frequencies for each of the inputs.

When the system is used with a satellite source for the input stream, other relevant parameters can also be set via the tuning parameters interface element 270, such as including an orbital position, low-noise block (LNB) power setting, signal polarization, and East or West flag. Those skilled in the art will appreciate that other tuning parameters can also be configured. An RF input configuration user interface element 272 can be utilized to configure the RF input parameters, including assigning PE's to output channels.

After the input stream has been configured in a desired manner corresponding to the selected input stream the parameters can be saved by selecting the save user interface element 274, which will result in the corresponding input stream parameters being saved into the DPM data of associated memory. Certain parameters may require a validation to ensure the information entered is appropriate, which validation can be performed by validation instructions being invoked via a validate user interface element 276. The validation instructions can apply predefined validation rules to the input parameters. Stored settings can be loaded from memory via a reload interface element 278.

Figure 14:
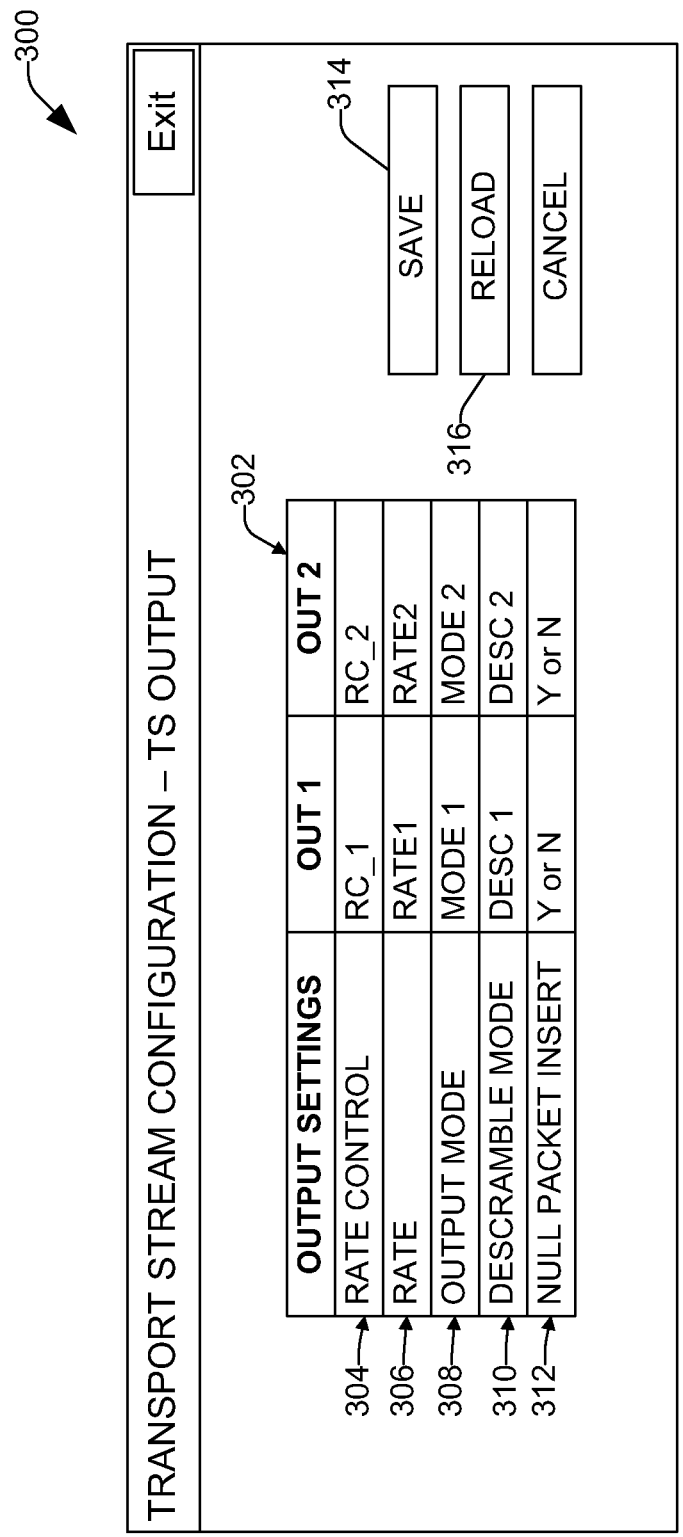
FIG. 14 illustrates an example of a user interface for set up of an output transport stream.

FIG. 14 depicts an example of a user interface, indicated at 300, that can be utilized for configuring the transport stream output on a global basis. The user interface 300 can provide a table 302 that contains a plurality of output fields for setting parameters for each of a plurality of outputs, indicated as OUT1 and OUT2. It is to be understood and appreciated that there can be any number of outputs, which may be lesser or greater than those depicted in FIG. 14.

In the example user interface 300, the output settings include a rate control parameter 304 which can be utilized to set an output bitrate for each of the outputs, indicated at RC_1 and RC_2 for each of the respective outputs. For instance, the rate control parameter 304 can be set to be automatic, such that the rate of the output signal corresponds to the input rate, or the output rate can be a user-selected rate. Where a user selected rate is selected for one or both of the outputs, a corresponding rate is set by the user according to known system requirements, indicated at field RATE_1 for OUT1 and field RATE_2 for OUT2.

A corresponding output mode parameter 308 can also configured for each of the respective outputs OUT1 or OUT2. The output mode parameter 308 can specify the type or types of data management and controls implemented by the system. For example, the output mode parameter 308 can be set to values to specify that the output will be identical to the input (e.g., a complete passthrough) such that remapping and content modification controls would not be supported. A second mode (e.g., a service channel mode) can be utilized to output only specified service channels. A third mode (e.g., a map passthrough mode) can be employed to generate the output to be identical to the input, except that mapping controls to perform mapping of PIDs or other specified identifiers, such as service IDs, as programmed in the DPM data. A fourth mode (e.g., a map service channel mode) can be used to limit mapping of PIDs or other specified identifiers, such as service IDs, to service channels. A fifth mode (e.g., full DPM) control can be employed to generate the output according to DPM settings applied to the entire transport stream. This mode of DPM control further can encompass additional sub-modes, each of which can be utilized to specify the particular type of content modification that is to be supported. Thus, based on which output mode is set will determine which types of other data management settings will be programmable for a given output. As described herein, certain types of data management can be applied globally on the transport stream, while others can be applied at a program entry level or at a PID level.

Other output settings can include a descramble mode that identifies the type of descrambling being implemented. For instance, a scrambled mode or a descrambled mode can be specified via the descramble mode parameter 310. A null packet insert parameter 312 can also be used to specify whether null packets are to be inserted into the respective output streams. After the corresponding settings have been configured for the output transport stream, the respective settings can be saved by hitting the save user interface element 314. Settings may be reloaded from memory such as according to activation of a reload user interface element 316.

Figure 15:
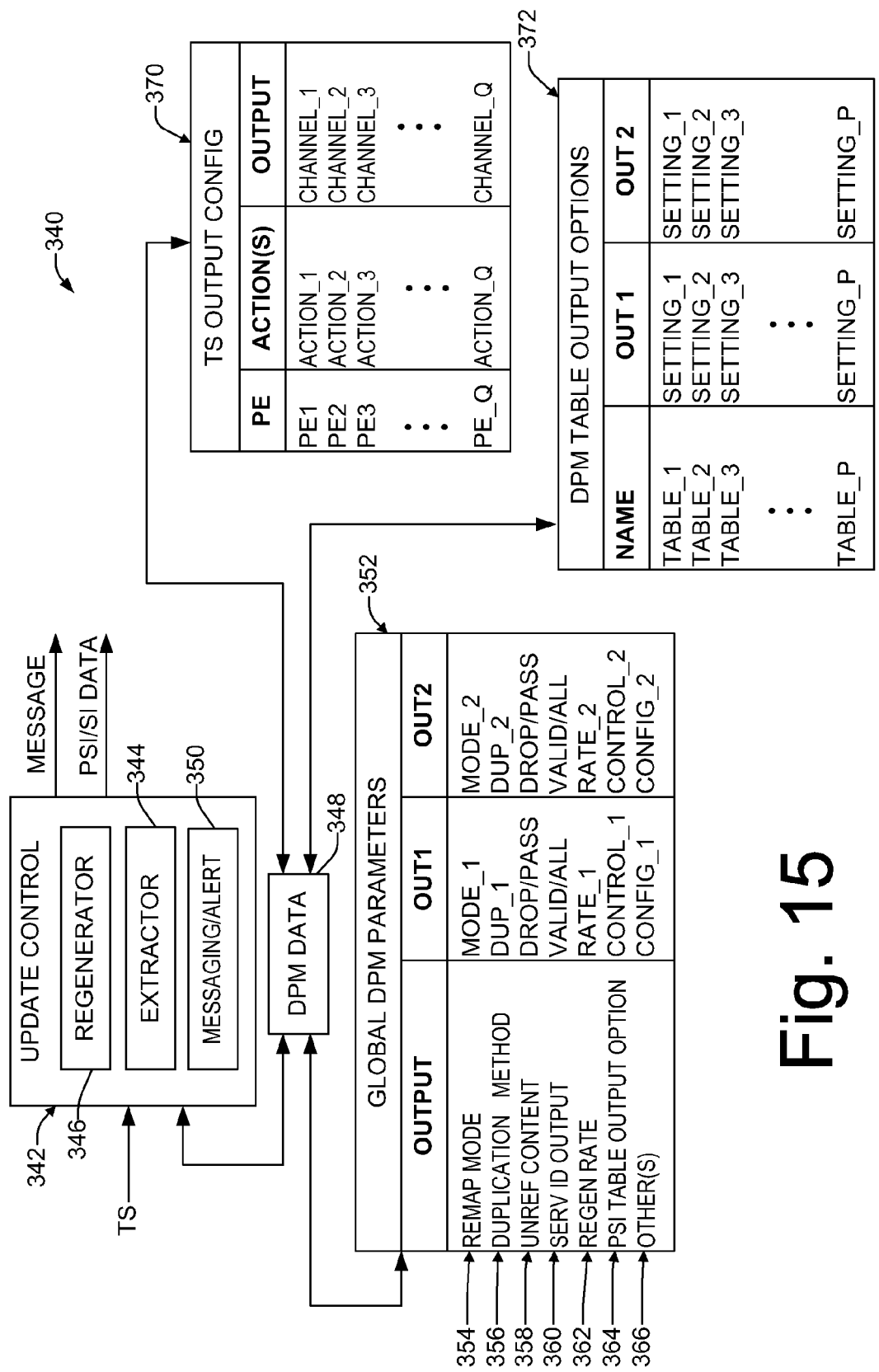
FIG. 15 illustrates an example of a system for controlling updating and messaging.

As described herein, when digital program management, including program content modification and/or mapping, is supported, the system can execute methods to control updating PSI/SI information as well to provide messaging or alerts relating execution of DPM controls. FIG. 15 depicts an example of a system 340 for generating updates and messaging to reflect various aspects of DPM. The system 340 that includes controls and associated user interfaces that can be implemented to facilitate updating and regenerating tables, such as those included in the PSI/SI information. The system 340 can also perform messaging to alert other processes or users about changes or other processing performed by the DPM system.

An update control 342 can be programmed and/or configured to provide the PSI/SI data that can be injected into an output transport stream for use in downstream equipment for subsequent processing of the transport stream. The update control 342, for instance, can be stored in memory as a control method that is executed by a processor (e.g., the processor 202 of FIG. 12). The update control 342 can include several functions based on which programmed controls are implemented.

In the example of FIG. 15, the update control 342 includes an extractor 344 that is operative to parse a transport stream (TS) and extract PSI/SI information from the transport stream. The extracted PSI/SI information can be stored in memory (e.g., the memory 206 in FIG. 12). The update control 342 also includes a regenerator 346 that is programmed to provide updated PSI/SI information based on DPM data 348, which can be programmed via a user interface to set configuration parameters that control the regenerator 346. The DPM data 348 can include settings to control the regenerator 346 for each output of the DPM system to pass selected PSI/SI information unchanged, to drop selected PSI/SI information from the transport stream and/or to modify or update selected PSI/SI information. The regenerator 346 can provide updated PSI/SI information that is to be injected into the output transport stream.

As an example, the regenerator 346 can be programmed to extend the correction/generation of PSI/SI tables to include a change in bitrate, a change in encoding format and encryption status, the details of which can be stored as part of the DPM data 348. The update control 342 further can implement signaling changes and adjustments in the transport stream to maintain compliance based on any modifications in the transcode control, transcrypt control, transrate control and encryption status. The regenerator 346 is programmed to provide updates and corrections in selected tables (e.g., PAT, CAT, PMT, NIT, SDT, and the like) being output, such as to adjust descriptors and flags in such tables to match the content modifying controls being implemented (e.g., transrating, transcoding, transcrypting, and encryption status).

The update control 342 can also include a messaging/alert component 350 that is programmed to provide messaging or alerts reflecting operations and controls implemented by the DPM system. The extractor 344, for example, can also parse the transport stream extract information from program content (e.g., PIDs, program metadata or the like). The types of information to be extracted can be programmed and stored as part of the DPM data associated with the messaging/alert component 350. The messaging/alert component 350 can be programmed to analyze (e.g., interpret and/or apply) information extracted from the transport stream, such as can be associated with one or more PE. The messaging/alert component 350 can thus be programmed to generate messages and/or take actions, such as program changes, based on analyzing the extracted information. It is to be understood that this is different from the use of PSI/SI table information in that the elementary stream content itself can be interpreted directly. For example, a change in the DPI (Digital Program Insertion) stream could be used to flag the change with a trap message in simple network management protocol (SNMP). SNMP traps enable an agent to notify a management station or other predetermined user or process of significant events by way of an unsolicited SNMP message, such as can be generated by the message/alert component 350 detecting certain criteria has been met. At the same time, the DPI stream could be modified in response to the trap message to remove the specific condition that initiated the trap message. Downstream devices similarly equipped may not repeat that same message—although this can vary according to system configuration and application requirements.

The update and messaging system 340, including the update control 342 can employ user interface features to facilitate configuration and setting of the various control functions for the DPM system. For instance, a GLOBAL DPM PARAMETERS user interface element 352 can be utilized to define global DPM parameters for each of the respective outputs indicated at OUT1 and OUT2. In the example of FIG. 15, various parameters are listed adjacent to the OUT1 and OUT2 settings. Thus, under each of the outputs OUT1 and OUT2 are the corresponding settings for the parameters listed in the left side column, as viewed in the example of FIG. 15.

By way of further example, a remap mode parameter 354 can be specified for each of the outputs indicated as settings MODE_1 and MODE_2. A duplication method parameter 356 can also be set for each of the outputs OUT1 and OUT2, as indicated at DUP_1 and DUP_2. The duplication parameter can be utilized if remapping of PIDs, or service IDs is active and operates to modify the PSI to duplicate a program and its content. One duplication mode can require an input PID be mapped to a single output PID, and rules can be employed to decide which output PID to use in the event of conflicting PIDs. Another mode can allow an input PID to be remapped to multiple output PIDS.

An unreferenced content parameter 358 can be specified to either drop or pass unreferenced content in the transport stream for each output. Alternatively or additionally, user-defined program functions can be implemented for processing unreferenced content in a desired manner, provided that DPM rules are not contravened. Since the content is identified as being unreferenced via the unreferenced content parameter 358 (e.g., a PID not identified in an MPEG DVB table), such content can be processed in a user-defined manner. For instance, a user can specify functions or rules (via programming of the DPM system) to perform on pre-identified unreferenced content. The processing can include the same types of functions and rules performed by the DPM system to referenced content as well as other types of user-defined processing. The processing of unreferenced content can further involve a separate rule set, which is subordinate to the DPM rules that control processing of such unreferenced content. Thus, the unreferenced content parameter 358 can enhance flexibility of the DPM system for processing unreferenced in ways that may be different from the rules established for referenced PIDs.

A service ID output parameter 360 can be used to specify whether the PSI tables will be generated even if a selected input channel is not available. For instance, the service ID output parameter 360 can instruct the update control 342 to provide the PSI tables for either all elementary streams or only those determined to be valid based upon evaluation of the respective service IDs.

Another global DPM parameter is the regeneration rate parameter 362, which can be set for each of the respective outputs indicated at RATE_1 and RATE_2. The regeneration rate parameter 362 specifies the rate at which the PSI/SI data will be regenerated and injected (or multiplexed) into the output transport stream at each output OUT1 and OUT2. A PSI output parameter 364 can be utilized to pass the PSI/SI table information from the input to the output unchanged (e.g., if the remapping and content modifying controls are not being used) or to allow user configuration thereof. In the example of each of the outputs OUT1 and OUT2 provide a user control option indicated at CONTROL_1 and CONTROL_2. Those skilled in the art may understand and appreciate other output parameters (indicated at 366) that can be specified and configured for each of the respective outputs indicated at CONFIG_1 and CONFIG_2.

A TS OUTPUT CONFIG user interface element 370 can be utilized to configure the transport stream output for each of a plurality of program entries indicated at PE_1 through PE_Q, where Q is a positive integer denoting the number of program entries for a given transport stream. For each PE, an input channel and an output channel can be specified such as indicated at CHANNEL_1 through CHANNEL_Q. Additionally, for each respective PE, an input channel and an output channel can be specified and a respective action (or plural actions) can be specified, indicated at ACTION_1 through ACTION_Q. For example, the actions can correspond to the DPM controls that can be applied to the transport stream, including remapping controls (e.g., drop, pass, map) as well as program content modifying controls (e.g., transcode, transrate, transcrypt). The actions can be selected from a drop-down list or other type of selection. Each of the output configurations entered via the user interface 370 can be stored in memory, such as forming part of the DPM data 348. When the DPM controls are specified for a given PE, additional user interfaces can be provided to configure parameters associated with the DPM controls being implemented.

Another user interface element 372 can be provided for setting the DPM table output options for each of a plurality of PSI/SI tables, which are schematically depicted at Table_1 through Table_P, where P is a positive integer denoting the number of tables. A respective setting can be provided for each table associated with each of the respective outputs represented as columns OUT1 and OUT2. As an example, for each respective table a setting can be entered for each output to specify whether the table is to be dropped, passed through such that the output table is identical to the input table or if the table is to be regenerated such as based on other DPM data entered into the DPM system. For the example of a MPEG transport stream, the PSI/SI data can contain a plurality of tables, such as including those listed in the following Table III. It will be appreciated that the particular set of tables and nomenclature can vary depending on the protocol being used and application requirements for the DPM system.

TABLE III

| Setting | Description |
| --- | --- |
| PAT | Program Allocation Table |
| CAT | Conditional Access Table |
| PMT | Program Map Table |
| TSDT | Transport Section Description Table |
| NIT | Network Information Table |
| NITO | Network Information Table - Other |
| SDT | Service Description Table |
| SDTO | Service Description table - Other |
| BAT | Bouquet Allocation Table |
| EIT | Event Information Table |
| TDT | Time-Date Table |
| RST | Running Status Table |
| TOT | Time Offset Table |
| DIT | Discontinuity Information Table |
| SIT | Selection Information Table |
| ECM | Encrypted Control Message |
| EMM | Entitlement Management Message |
| DRT | Disaster Recovery Table |
| CDT | Code Download Table |

The settings entered via the user interface element 372 can be stored as part of the DPM data 348. The regenerator 346 can utilize the settings entered via the user interface element 372 to control generation or regeneration of the PSI/SI data.

Figure 16:
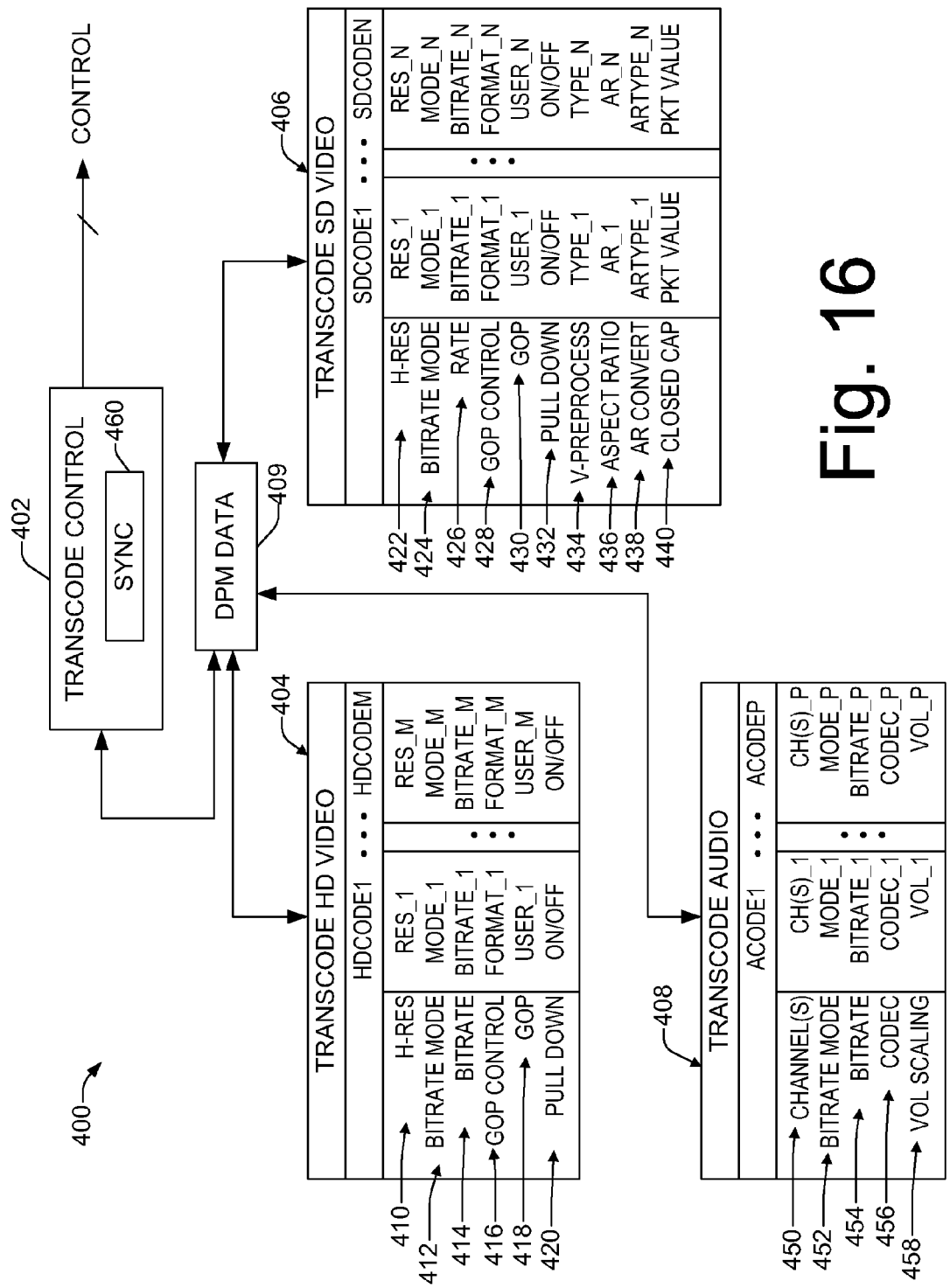
FIG. 16 illustrates an example of a system and user interfaces for controlling transcoding of program content.

FIG. 16 depicts an example of a transcoding control system 400 that can be utilized in the DPM system to configure or set various transcoding features. The system 400 includes a transcode control module 402 that is associated with a plurality of user interface elements 404, 406 and 408. Each of the user interface elements 404, 406 and 408 can be employed for setting selected parameters for controlling transcoding of program content. The transcode control 402 can correspond to a set of controls that are executed by a processor (e.g., the processor 202 of FIG. 12) to control a transcode unit (e.g., the transcode unit 232 of FIG. 12) of the DPM system. The transcode control settings can be stored as part of DPM data 409 in memory, such as described herein. There can be various default settings for the transcode control 400, which can be automatically configured in the absence of being programmed via the user interface elements 404, 406 and 408.

By way of illustration, in each of the user interface elements 404, 406 and 408, the columns can represent respective transcoder indices that can be referenced by the DPM system, including the transcode control 402, for configuring the transcoding that is to be applied to the transport stream. Those skilled in the art will appreciate various man-machine interfaces that can be realized for setting parameters associated with transcoding program content. As one example, the transcode indices can be selected via another user interface element (e.g., user interface element 370 of FIG. 15) to define the transcode parameters on a PE-by-PE basis. Alternatively, a user interface element (not shown) can be utilized to configure transcoding control parameters at a PID level.

As one example, the user interface element 404 can be utilized for transcoding high definition (HD) video. In the user interface element 404, columns are provided beneath each transcode index, indicated at HDCODE1 and HDCODEM (where M is positive integer denoting the number of transcode indices for transcoding HD video) for each of various transcode control settings or parameters. For example, a high definition horizontal video resolution parameter, indicated at 410, can be set for each of the M indexes indicated at RES_1 and RES_M. A selected resolution setting can be selected from a drop down list associated with each of the respective indices or the setting may be manually entered to achieve a desired output resolution.

A bitrate mode parameter 412 can be utilized to select the bitrate mode for the transcode output channel. For example, the bitrate mode can be selected from a group of predetermined modes such as including statistical multiplexing, variable bitrate, constant bitrate or other bitrate modes. With the mode selected, a corresponding value can be entered at a bitrate setting, indicated at 414. Thus, by setting the bitrate_1 or bitrate_M for each of the respective indices, the output bitrate can be set to a desired rate, which may be the same or different from the input rate.

A group of pictures (GOP) control parameter 418 can be utilized to set a desired control option, indicated at FORMAT_1 and FORMAT_M. For instance, the GOP control parameters can be set to a user-selected GOP or an I-frame sync control setting. If a user-selected GOP control format is selected, a corresponding GOP field 418 can be manually set to alter the GOP structure, such as to one of a plurality of predefined GOP structures, indicated at USER_1 and USER_M. The predefined structures can be selected via a pull-down menu or other user-entry mechanisms for each of the respective inputs. Additionally, 3:2 pull down parameter 420 can be enabled or disabled (e.g., turned on or off) for each of the respective transcode indices.

The user interface element 404 can be utilized for transcoding that is being performed on standard definition video elementary streams. The SD settings for each of the respective transcode channels indicated at SDCODE1 through SDCODEN, where N indicates the number of transcode indices for SD video transcoding. Similar to the transcode HD video user interface element 402, the SD video user interface element 404 includes a plurality of settings that can be programmed to control transcoding of video program content in one or more elementary streams.

By way of example, a horizontal output video resolution (H-RES) parameter can be selected via an H-RES setting indicated at 422. For instance, each of the H-RES settings, indicated at RES_1 through RES_N, can be utilized to set (e.g., via a drop-down menu or manual entry) a desired horizontal resolution. A bitrate mode parameter 424 can be selected via the MODE_1 through MODE_N entries for each of the N transcode indices. Examples of mode settings include variable bitrate (VBR), constant bitrate (CBR) or statistical multiplexing. When the transcoding is configured to perform down-converting, such as from HD to SD video for the output channel, a corresponding output rate can be selected via the rate parameter 426. Corresponding output rate parameters 426 can be entered for each transcode index via fields, indicated at BITRATE_1 through BITRATE_N, such as by specifying a desired range of megabits per second (Mbps) for each of the respective indices.

A GOP control setting 428 can be utilized to set the GOP control to either manual or an I-frame sync via FORMAT_1 and FORMAT_N fields, such as can be selected via drop-down menus or otherwise. If the value of the GOP control setting 428 for a respective index is set to manual, a GOP setting 430 can be utilized to set the format value to define a user-selected GOP structure, indicated at USER_1 and USER_N. A pull-down parameter, indicated at 432, can be utilized to enable or disable a 3:2 pull-down.

A video pre-processing parameter, indicated at 434 can also be utilized to select a type of pre-processing that is to be performed on the encoded output. For example, the video pre-processing parameter 434 can be set for each transcode index, indicated at type_1 through type_N, such as may include an edge enhancement, a mosquito enhancement or a D-block type of filtering. Those skilled in the art will understand and appreciate other types of filtering and pre-processing that can be performed individually or in combination via the video pre-processing parameter 434.

The transcoding can also be utilized to select an aspect ratio via the parameter 436. Aspect ratio, for example, can be set to a 4:3 or 16:9 or other defined aspect ratio for each transcode index, indicated at AR_1 through AR_N. Additionally, an AR convert parameter 438 can be set to perform aspect ratio conversion on the output signal. For instance, such conversion enables that the picture to be displayed correctly on a television, which can include a particular aspect ratio conversion or an automatic setting based upon a descriptor provided in the transport stream. A closed-captioned setting 440 can be utilized to set a closed-caption package value according to any one of a plurality of known closed-captioning standards, which can be entered for each index, indicated at PKT VALUE.

In addition to the video transcoding that can be configured for transcoding video program content, the transcode control system 400 can also include a transcode audio user interface element 408. It will be appreciated that for a given PE, there can be any number of one or more audio streams, each of which can be identified by a corresponding PID value. The transcode unit can be configured to pass the audio encoding from the input to the output unmodified, or transcode the audio from a one audio compression codec to a different codec and/or to a different bitrate according to various user selectable settings.

As an example, the transcode audio user interface element can be employed to define audio transcoding parameters for each of a plurality of different transcode indices, indicated as ACODE1 through ACODEP, where P is a positive integer denoting the number of audio transcode indices. Thus, the transcode audio identifies the respective number or configuration of output channels (e.g., stereo, Dolby Digital 5.1, mono or the like) via a channel setting 450 which can be specified for each channel index via a CH_1 or CH_P setting. A corresponding bitrate mode can also be selected via bitrate mode setting 452 indicated as MODE_1 and MODE_P. A corresponding bitrate for the output audio elementary streams can also be set by the user via a bitrate parameter 454.

An audio codec parameter 456 can also be programmed for each index, indicated at CODEC_L through CODEC_P, to define the type of audio compression algorithm implemented by the transcode unit (See, e.g., Table II). The corresponding type of audio compression, for example, can be selected via drop-downs associated with user-entry fields TYPE_1 through TYPE_P. A volume scaling parameter 458 can also be utilized to set a volume scaling value, which can be entered via fields VOL_1 through VOL_P, to provide a percentage scaling of the input audio.

The transcode control module 402 further can include a synchronization component 460 to ensure that each respective video program stream for a given PE maintains appropriate synchronization (or lipsync) with each associated audio program stream that is being transmitted. Those skilled in the art will understand and appreciate various ways to implement the audio/video synchronization. For example, the synchronization component 460 can use timing information in the form of interlaced video and audio data, be explicit same typing or by relative time stamping of data where the bitrates and encoding vary for the respective audio and video program content. Presentation time stamps can be embedded or maintained and the signals received by the DPM system to mitigate the error in the audio/visual synchronization. The transcode control module 402 can provide the transcode control signal to a transcode unit of the DPM system, such that appropriate transcoding of audio/video or audio and video is performed on the program content. As described herein, transcoding can be performed at the PID level by selectively controlling transcoding for each elementary stream of a given PE.

The type of transcoding performed in response to transcode parameters in the DPM data 409 may vary depending on the type of encoding of an input stream. For example, as described herein, a PE or service can be dynamically remapped for various reasons (e.g., force tunes, disaster recovery, or the like). When such remapping occurs, it is feasible that the type of audio and/or video encoding for PIDs in a first PE can vary from the type of encoding for PIDs in an alternate, replacement PE (see, e.g., FIGS. 4, 5 and 8 where PID may be dropped due to different types of encoding). Thus, instead of dropping an elementary stream having a different type of encoding, the transcode control 402 (or other functions, e.g., in the update module 342 of FIG. 15) can analyze the input encoding for an identified PE and selectively employ transcoding of audio, video or both audio and video. In this way, the DPM system can ensure that each elementary stream is output in the proper encoding format, according to the transcoding settings stored as part of the DPM data 409.

It will be appreciated that the DPM system, including the transcode control 402, can employ rules to ensure that transcode settings for a given elementary stream are valid. Such rules can further automatically trigger actions including transcoding or other content modification in the event that certain predefined conditions are satisfied. Thus, the DPM system and associated methods provides a flexible approach to manage for digital broadcast programming.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An apparatus for management of digital programs, comprising:
an input port configured to receive at least one transport stream, the at least one transport stream including a plurality of program elementary streams, each program elementary stream comprising a plurality of packets each including a packet identifier (PID) that identifies a corresponding program elementary stream for a respective program and program content data for the respective program;
plural content modifying units arranged in a communication path between the input port and an output port of the apparatus, the plural content modifying units being operative to:
select at least one program corresponding to at least one of the plurality of program elementary streams based on a respective control signal to provide a selected program;

modify at least the program content data of the selected program, the program content data including actual program content of the at least one of the plurality of program elementary streams corresponding to the selected program; and a processor programmed to provide the respective control signal signals to each of the content modifying units based on user-programmable management data stored in associated memory, wherein the user programmable management data defines rules that characterize conditions for modified program content provided at the output port, wherein the conditions specify at least one of an encryption format, a bitrate and an encoding format for the modified program content provided at the output port, wherein the processor selectively controls the plural content modifying units to satisfy the conditions for the modified program content provided at the output port;

the plural content modifying units being further operative to modify the actual program content in the at least one of the plurality of program elementary streams corresponding to the selected program by performing at least two of transcryption, transrating, and transcoding of the actual program content based on the respective control signal to provide the modified program content data at the output port.

2. The apparatus of claim 1, further comprising an update module programmed to update at least one of program specific information and service information (PSI/SI) based on the user-programmable management data to reflect modifications of the program content data being made by the content modifying units.

3. The apparatus of claim 2, wherein the PSI/SI further comprises at least a conditional access table, a program map table, and a program access table.

4. The apparatus of claim 2, wherein the update module further comprises a messaging/alert component that is programmed to send at least one message to inform one or more pre-identified recipient of at least some of the modifications of the program content data made by the content modifying units.

5. The apparatus of claim 1, further comprising a user interface configured to receive user instructions that specify parameters for content modification that is to be performed relative to the program content data corresponding to at least one given program entry, the user instructions being stored as the user-programmable management data in the associated memory.

6. The apparatus of claim 5, wherein the processor selectively controls at least one of the plural content modifying units for modifying the program content data in each elementary stream that is associated with the at least one given program entry according to the user instructions.

7. The apparatus of claim 1, further comprising a user interface configured to receive user instructions that include packet identifiers that specify content modification to be performed by at least one of the content modifying units for each elementary stream that is selected according to the packet identifiers specified in the user instructions, the user instructions being stored in the associated memory as the user-programmable management data.

8. The apparatus of claim 7, wherein the processor selectively controls at least one of the plural content modifying units for modifying the program content data of each selected elementary stream identified by the packet identifiers in the user instructions.

9. The apparatus of claim 1, wherein the content modifying units further comprise:

a transcrypt unit operative to at least one of decrypt and encrypt selected program content in the at least one transport stream based on a transcrypt control signal from the processor, the transcrypt control signal being provided based on the user-programmable management data stored in the associated memory; and a transcode unit operative to at least one of decode and encode selected program content in the at least one transport stream based on a transcode control signal from the processor, the transcode control signal being provided based on the user-programmable management data stored in the associated memory.

10. The apparatus of claim 9, wherein the user-programmable management data further comprises decryption parameters for controlling transforming the selected program content from first predetermined encryption format to a non-encrypted format according to one of a plurality of predefined decryption parameters, and wherein the user-programmable management data further comprises encryption parameters for controlling transforming non-encrypted program content to a selected one of a plurality of encrypted formats to provide for conditional access thereof.

11. The apparatus of claim 9, further comprising a remapping component that is programmed to remap at least one first packet identifier associated with a first program entry to at least one second packet identifier associated with a different program entry such that the corresponding program elementary stream associated with the at least one first packet identifier is replaced with a program elementary stream that is associated with the at least one second packet identifier.

12. The apparatus of claim 9, further comprising a remapping component that is programmed to remap an alternate program entry for a given program to a primary program entry for a primary program such that the program elementary streams for the given program replace the program elementary streams of the primary program.

13. An apparatus for management of digital programs, comprising:

a receiver configured to receive at least one transport stream that includes a plurality of program streams, each program stream comprising a plurality of packets each including a packet identifier (PID) that identifies a corresponding elementary stream for a respective program and program content data for the respective program;

plural content modifying units arranged in a communication path between an input port and an output port of the apparatus, the plural content modifying units being operative to:

select at least one program corresponding to at least one of the plurality of program streams based on a respective control signal to provide a selected program;

modify at least the program content data of the selected program, the program content data including actual program content of the at least one of the plurality of program streams corresponding to the selected program;

memory storing user-programmable management data that define parameters for controlling each of the plural content modifying units, at least some of the parameters being stored in the memory in response to user input via a user interface;

a processor programmed to provide the respective control signals to control each of the content modifying units based on the user-programmable management data stored in the memory; and an output interface configured to provide an output transport stream to the output port based on modified program content data, wherein the user programmable management data defines rules that characterize conditions for the modified program content data provided at the output port, wherein the conditions specify at least one of an encryption format, a bitrate and an encoding format for the modified program content data provided at the output port, wherein the processor selectively controls the plural content modifying units to satisfy the conditions for the modified program content data provided at the output port;

wherein the modifying of the at least the program content data by the plural modifying units comprises modifying the actual program content in the at least one program stream corresponding to the selected program by perform at least two of transcryption, transrating, and transcoding of the actual program content based on the respective control signal to provide the modified program content data at the output port.

14. The apparatus of claim 13, further comprising a remapping component that is operative to remap at least one first packet identifier associated with a first program entry to at least one second packet identifier associated with a different program entry such that the program stream associated with the at least one first packet identifier is replaced with the program stream of the at least one second packet identifier, the processor providing remapping control signal based on the user-programmable management data to control the remapping performed by the remapping component.

15. The apparatus of claim 14, wherein the remapping component is further operative, based on the remapping control signal, to remap an alternate program entry for a given program to a primary program entry for a primary program such that the program streams for the given program replace the program streams of the primary program.

16. The apparatus of claim 13, wherein the plural content modifying units further comprise:
a transcrypt unit operative to at least one of decrypt and encrypt selected program content in the at least one transport stream based on a transcrypt control signal from the processor, the transcrypt control signal being provided based on the user-programmable management data stored in the memory; and
a transcode unit operative to at least one of decode, encode and change bit rate of selected program content in the at least one transport stream based on a transcode control signal from the processor, the transcode control signal being provided based on the user-programmable management data stored in the memory.

17. The apparatus of claim 13, further comprising an update module stored in the memory, the processor executing instructions corresponding to the update module to update at least one of program specific information (PSI) and service information (SI) based on the user-programmable management data to reflect modifications of the program content data being made by the content modifying units.

18. The apparatus of claim 17, wherein the update module further comprises a messaging/alert component that is programmed to send at least one message to inform one or more pre-identified recipient of at least some of the modifications of the program content data made by the content modifying units.

19. The apparatus of claim 13, wherein the processor selectively controls each of the plural content modifying units for modifying the program content data in selected elementary streams that is associated with at least one given program entry based on the user-programmable management data stored in the memory.

20. An apparatus for management of digital programs, comprising:
an input port configured to receive at least one transport stream, the at least one transport stream including a plurality of program elementary streams, each program elementary stream comprising a plurality of packets each including a packet identifier (PID) that identifies a corresponding program elementary stream for a respective program and program content data for the respective program;
plural content modifying units arranged in a communication path between the input port and an output port of the apparatus, the plural content modifying units being operative to:
select at least one program corresponding to at least one of the plurality of program elementary streams based on a respective control signal to provide a selected program;
modify at least the program content data of the selected program, the program content data including actual program content of the at least one of the plurality of program elementary streams corresponding to the selected program;
a processor programmed to provide the respective control signal to each of the content modifying units based on user-programmable management data stored in associated memory; and
an update module programmed to update at least one of program specific information and service information (PSI/SI) based on the user-programmable management data to reflect modifications of the program content data being made by the plural content modifying units,
wherein the user programmable management data defines rules that characterize conditions for modified program content provided at the output port, wherein the conditions specify at least one of an encryption format, a bitrate and an encoding format for the modified program content provided at the output port, wherein the processor selectively controls the plural content modifying units to satisfy the conditions for the modified program content provided at the output port;
wherein the modifying of the at least the program content data by the plural content modifying units comprises modifying the actual program content in the at least one of the plurality of program elementary streams corresponding to the selected program by perform at least two of transcryption, transrating, and transcoding of the actual program content based on the respective control signal to provide the modified program content at the output port.

* * * * *